March 5, 1963  R. HASTINGS, JR  3,080,019
INDUSTRIAL TRUCK BRAKE CONTROL SYSTEM
Filed June 8, 1959  7 Sheets-Sheet 1
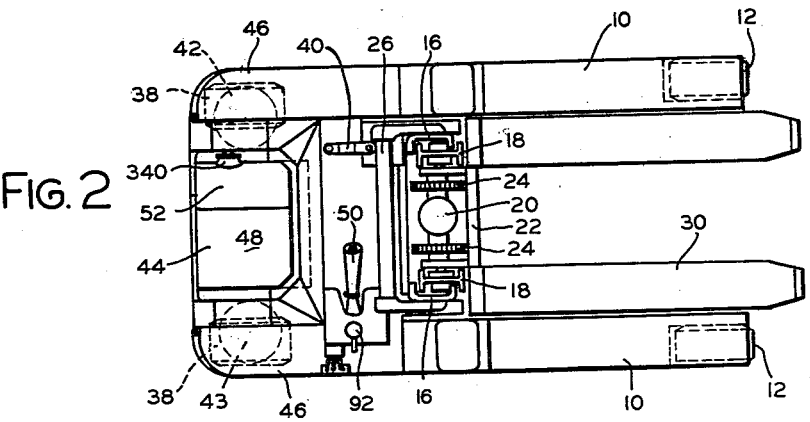
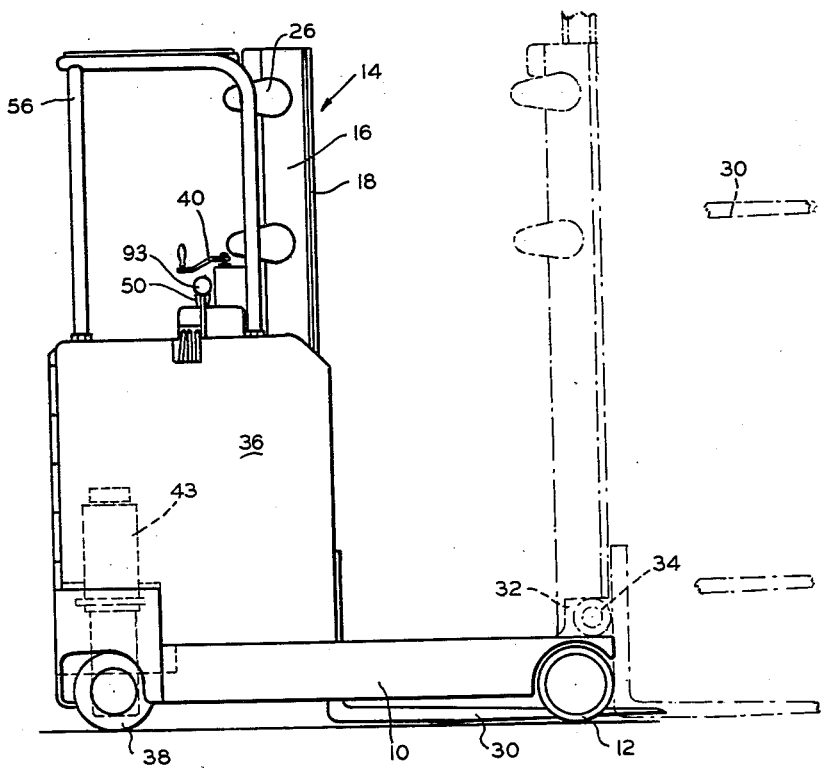
*INVENTOR.*
RUSSELL HASTINGS JR.
BY
ATTORNEY

INVENTOR.
RUSSELL HASTINGS, JR.
BY
ATTORNEY

March 5, 1963

R. HASTINGS, JR 3,080,019

INDUSTRIAL TRUCK BRAKE CONTROL SYSTEM

Filed June 8, 1959

INVENTOR.
RUSSELL HASTINGS JR.

BY *J.C.Wiessler*

ATTORNEY

March 5, 1963  R. HASTINGS, JR  3,080,019
INDUSTRIAL TRUCK BRAKE CONTROL SYSTEM
Filed June 8, 1959  7 Sheets-Sheet 4
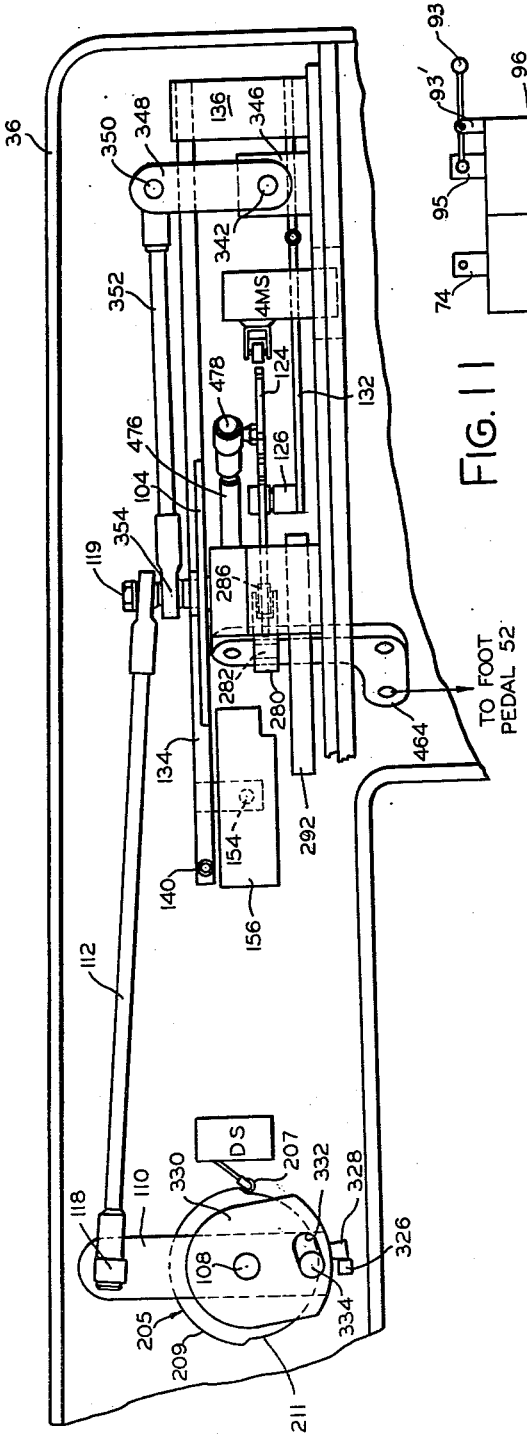
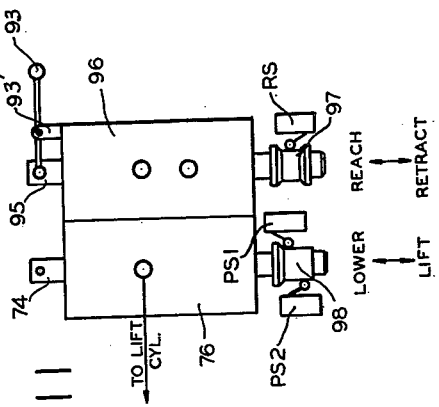
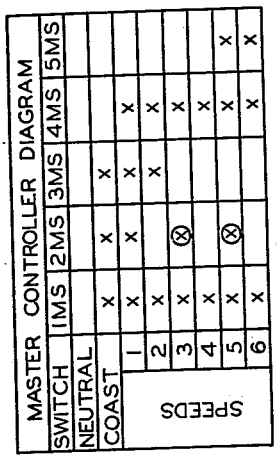
| MASTER CONTROLLER DIAGRAM | | | | | |
|---|---|---|---|---|---|
| SWITCH | 1MS | 2MS | 3MS | 4MS | 5MS |
| NEUTRAL | x | x | | | |
| COAST | x | x | ⊗ | | ⊗ |
| SPEEDS 1 | x | x | x | | |
| 2 | x | x | x | x | |
| 3 | x | x | x | x | x |
| 4 | x | | x | x | x |
| 5 | x | | | x | x |
| 6 | | | | x | x |
INVENTOR.
RUSSELL HASTINGS JR.
BY *J. P. Wiessler*
ATTORNEY

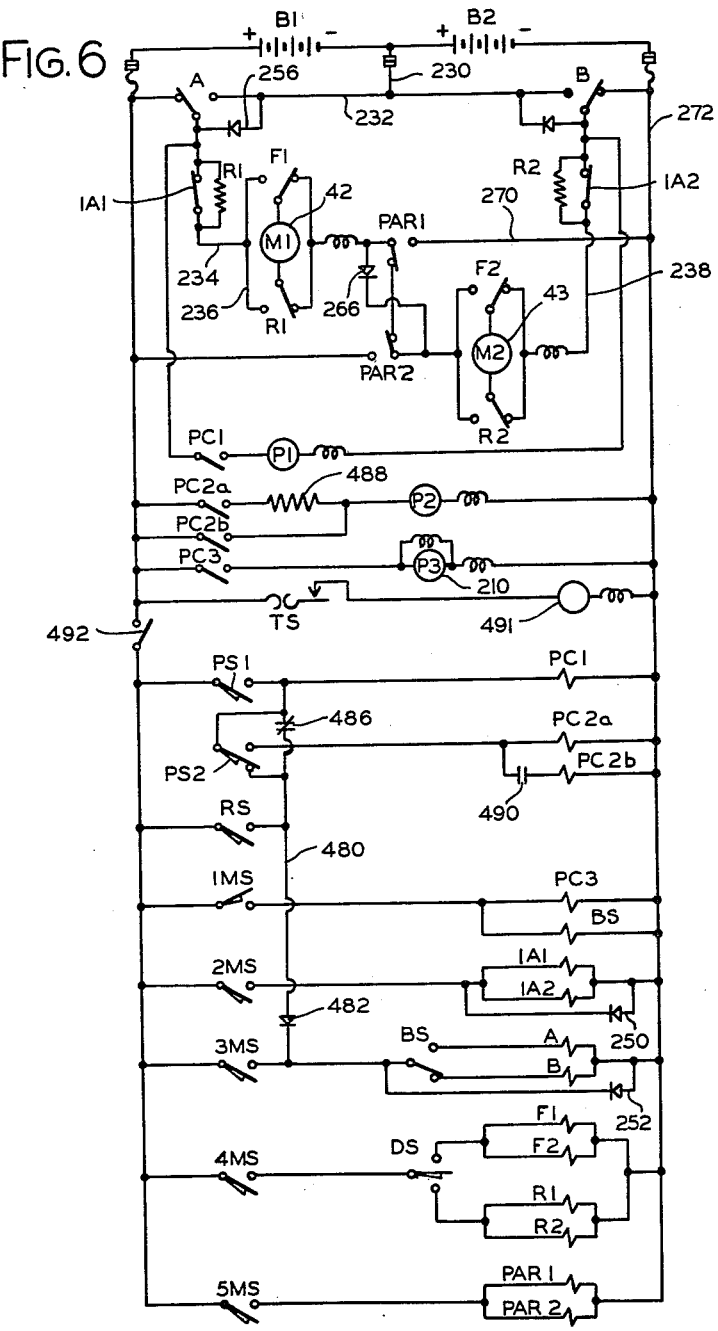

INVENTOR.
RUSSELL HASTINGS JR.
BY P.P. Wiessler
ATTORNEY

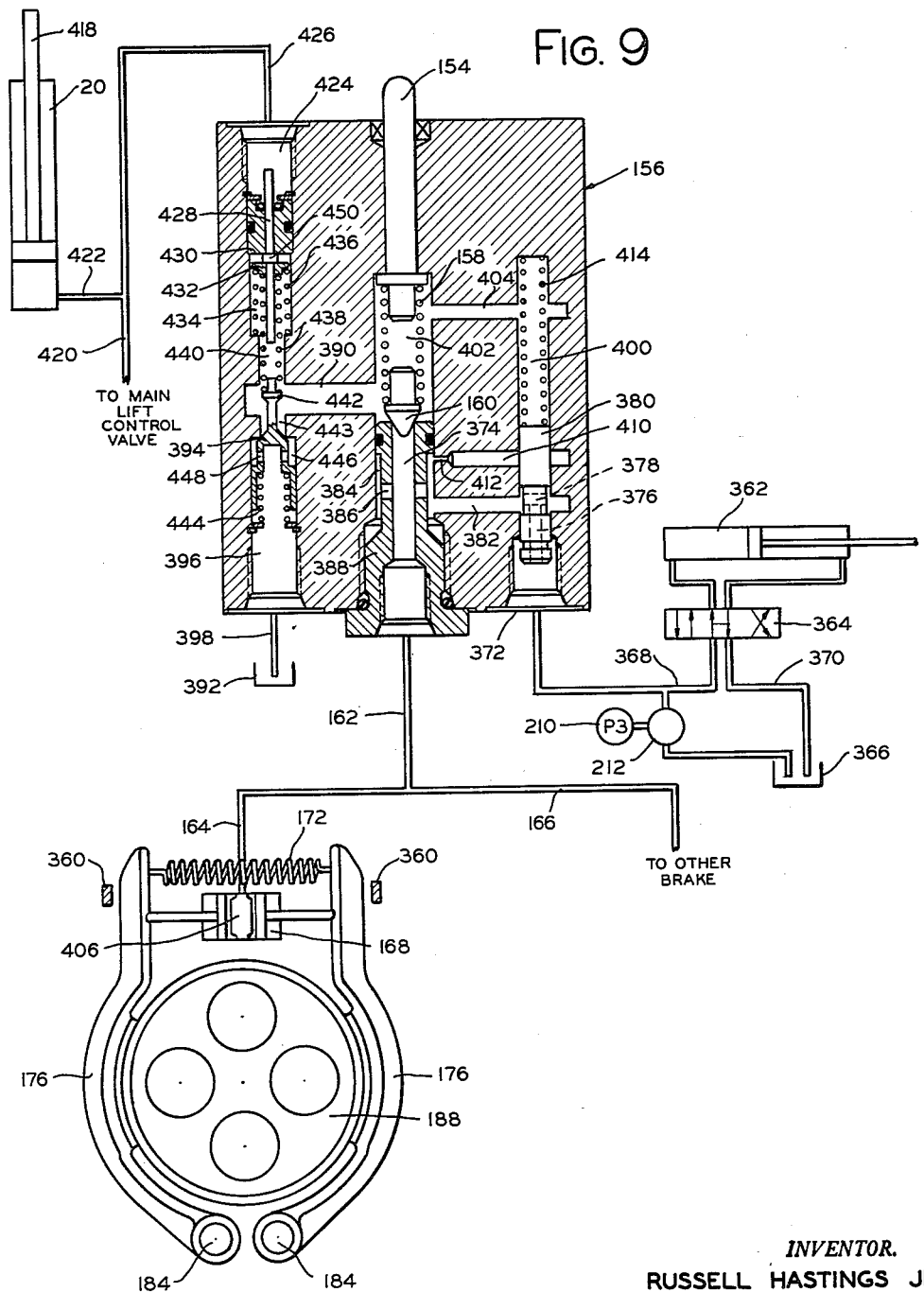

United States Patent Office 3,080,019
Patented Mar. 5, 1963

3,080,019
INDUSTRIAL TRUCK BRAKE CONTROL SYSTEM
Russell Hastings, Jr., Battle Creek, Mich., assignor to Clark Equipment Company, a corporation of Michigan
Filed June 8, 1959, Ser. No. 818,869
27 Claims. (Cl. 187—9)

This invention relates to industrial trucks and more particularly to industrial lift trucks of a type generally known as "reach" or "narrow-aisle" lift trucks which are capable of performing all necessary material handling operations in warehouse access aisles, for example, of relatively narrow width, thereby enabling more profitable use of storage floor area.

Warehousing of stacked palletized loads in rows with access aisles between rows necessitates insertion and removal of individual palletized loads in a direction transversely of the aisle and between adjoining stacks. If a counter-balanced type of lift truck, which comprises in essence a motor driven truck having a lifting fork projecting beyond the wheel base at one end, a counter-balancing weight located at the opposite end and an intermediate operator station, is to be manipulated to make right angle turns in the access aisle its overall length demands a relatively wide aisle even though the truck has a short turning radius. This is mainly true because the length of the lifting forks are added to the length of the wheel base. A wide access aisle represents lost storage area.

To conserve space, narrow-aisle lift trucks have been marketed heretofore which can be turned in an aisle only slightly larger than the truck wheel base and whose lifting fork can be retracted during normal truck travel and projected during loading and unloading operations with the components so arranged that the weight of the overhanging projected fork and its load is properly balanced to preclude tipping of the vehicle. In certain ones of such trucks, the lifting forks are constructed for projection and retraction in a horizontal path from either a floor level position or at any selected elevated stacking position.

Such trucks normally provide a U-shaped pocket at the one end, the legs or outriggers of which are supported at their free ends on ground engaging wheels, and an upright and lifting fork assembly mounted for longitudinal movement relative to said legs such that the lifting fork can be retracted and extended within and beyond the U-shaped pocket, respectively. A truck framework extends rearwardly of the base of the U-shaped pocket and provides traction means for the truck, as well as operator and truck control means. With the fork in retracted position the load may be transported above the main frame and between the front and rear wheels.

For unloading in a location beside an aisle, narrow-aisle trucks are driven through the aisle to the unloading location and then turned transversely of the aisle to bring the extendible fork into alignment with the opening or storage space in the row. The lifting fork with its loaded pallet is first positioned at the desired level and then projected from the truck into the storage space. Thereafter, the fork is lowered slightly to deposit the pallet either on the floor or in stacked relation to another load, as the case may be, and then retracted in a straight line until it is located without the pallet, whereupon the truck may be swung in the aisle and driven away.

For removing the palletized load from any selected storage position in a row, the truck with its lifting fork retracted is brought into alignment with a pallet and then, in succession, the fork is projected in a straight line under the pallet, is raised to pick up the load, and is retracted to bring the loaded fork outside the storage row, whereupon the truck is ready to be turned and driven through the aisle. Straight line extension and retraction of the lift fork is of importance for proper handling of pallets. It will be seen that with the fork fully retracted there is no substantial overhang thereof beyond the main frame, thereby enabling a minimum of turning clearance and the use of narrow aisles with consequent maximum utilization of storage area. In warehouse storage plants having a given floor area supporting multiple parallel rows of stacked and palletized loads, for example, it has been found that the use of narrow-aisle trucks of a given lifting capacity may generally be said to effect a saving in floor space of about twenty-five percent as compared with the use of counter-balanced lift trucks of the same capacity.

Narrow-aisle trucks have not previously enjoyed great commercial success. If space savings of the magnitude indicated above can be realized, the question arises as to why counter-balanced fork trucks have not been made obsolete, at least insofar as material handling operations within warehouse installations, for example, are concerned?

Careful investigation of the reasons for this seeming anomaly has indicated that serious operational limitations and disadvantages exist in all currently available narrow-aisle trucks which makes them essentially unsuitable for many warehousing and like applications, even to the extent of inducing many owners to utilize counter-balanced trucks despite space savings in the use of narrow-aisle trucks of the magnitude indicated above.

In my copending U.S. application Serial No. 818,678, filed June 8, 1959, now Patent No. 3,057,426, there is disclosed a novel traction wheel and motor construction in trucks of the type contemplated which utilizes two laterally spaced drive wheels at the rear of the truck and a separate non-rotatable traction motor associated with each such wheel, such motors being constructed to rotate in opposite directions in operation which essentially eliminates undesirable motor torque reaction in that one motor off-sets the opposite torque reaction of the other. In this manner, turning force which would otherwise have to be restrained by the operator exerting an opposed force through the steering wheel is eliminated.

The present invention is primarily concerned with a vastly improved control system for such dual trraction units, and, therefore, details of the traction units per se are not disclosed herein, reference being made to the aforementioned copending application.

A universal problem heretofore experienced in the operation of stand-up drive reach trucks relates to inconvenience to the operator in that such trucks have been inherently awkward and tiring to operate. Until the present invention the only means devised for applying the brakes while utilizing the same as parking brakes required the operator to balance on one foot while elevating the other foot from the brake pedal located in the floor portion of the operator's station. Such trucks have normally applied spring actuated brakes which are released by depressing the brake pedal. It is not only fatiguing to be required to balance on one foot while keeping the other foot raised from the pedal, but it has also been found to be tiring to continue to hold the pedal down through a considerable part of the day inasmuch as the operator is unable to momentarily shift his weight from one foot to the other during movement of the truck. The seriousness of this problem may be more fully appreciated when it is realized that during a normal day's operation such a truck may be required to stop and start several hundreds of times.

It is therefore one of the important objects of the present invention to provide a vastly improved braking system which is operated by a hand actuated master control so that the operator is free to shift his weight from one foot to the other and is never required to balance on one foot while applying the brake with the other.

Another object of the present invention is to combine the braking and power steering systems in such a manner that the hydraulic energy of the steering system back pressure is utilized to operate the braking system.

It has been customary in conventional sit-down counterbalanced lift trucks for the operator to utilize both his hands and his feet simultaneously to operate the controls. In a stand-up lift truck, however, it has been found that the operator's feet should be utilized only for standing purposes and not for control purposes, as explained above. The operator's left hand is normally more or less continuously employed in steering the truck, whereby only one hand remains which is free to operate all other controls of the truck. Also, it is customary for a skillful driver to lift or lower the fork tines, while at the same time controlling the forward or reverse motion of the truck. In order that such stand-up trucks be as versatile as sit-down trucks, I have provided a master controller at the operator station which is controlled in all of its functions by means of a single operator control member. My invention provides a master control member by means of which the driver can, in the use of one hand only, control the direction of movement of the truck, control the brakes of the truck, select any one of a plurality of operational speeds in both forward and reverse, and control simultaneously, if desired, lifting or lowering of the fork tines, while, at the same time, provide a supporting member for steadying the operator which in no way interferes with operation of the truck.

It has been found that accelerating and braking forces often cause the driver to lurch forward or backward in stand-up type trucks. In prior constructions the operator has had no available means by which to steady himself. Inasmuch as the vehicle of the present invention provides higher speeds of travel than heretofore available in such trucks, the above problem tends to be accentuated. My structure provides a control member construction which is capable not only of controlling the various above mentioned functions, but in addition provides an operator stabilizing means.

It is a feature of my construction to provide auxiliary control means at the operator station which permits the driver to turn his body 90° or more in order to achieve improved visibility while driving the vehicle in reverse and which, at the same time, is capable of controlling speed, direction and braking of the truck, the same as in the use of the master control member.

My construction provides a master controller actuatable by the above mentioned main operator control member or by the auxiliary control means and capable of providing, in conjunction with improved traction motor control circuitry, substantially more efficient and versatile utilization of the energy output of the batteries of the truck than has heretofore been possible.

In the latter mentioned construction I have utilized, among other things, a compact rotatable camming means which actuates mechanically in accordance with a predetermined schedule a plurality of master switching elements which are connected in the electrical control circuits for the traction motors to provide a plurality of operating speeds, a plurality of transitional speeds between the operating speeds, and battery sequencing and motor voltage control means. Broadly speaking, the traction motor circuits are arranged so as to provide three operating travel speeds, namely, full speed, half speed and quarter speed. In none of these operating speeds is any resistance used, thereby conserving battery energy. The speed control is primarily a voltage control in contrast to a resistance control. The speed is reduced from full speed to half speed by reconnecting the two traction motors in series with each other instead of in parallel. Quarter speed is achieved by using only one half of the battery. During acceleration in the transitional speed ranges, i.e., between the three operating speeds, resistance is momentarily introduced in the circuit to provide smooth acceleration and to minimize arcing when certain of the switches are operated. Rectifiers are utilized which are operational during transitional speeds to provide continuous and uninterrupted current flow through the traction motors whereby contactor switches are relieved of the duty of interrupting the current, again reducing contactor arcing. The master controller also provides battery sequencing means wherein a battery sequence relay is automatically actuated each time the controller is returned to a neutral position to thereby reconnect the opposite half of the battery in circuit, as compared to the half of the battery just previously utilized. The sequence relay is provided to assure substantially identical usage of both halves of the battery whereby to avoid unequal depletion of the charge in the various cells thereof.

As will appear fully in the detailed description which follows later herein, the master controller in combination with the electrical circuitry and single operator control handle provides a highly efficient, extremely compact, and smoothly operating truck control which requires a minimum of driver skill in operation.

In addition to the foregoing briefly described master controller elements, I have provided a timing device in the master controller which comprises generally a balance wheel type mechanism operated by the controller camming means and responsive to rotation of the camming means such that the mechanism effectively moves in advance of the camming means to lock same momentarily during acceleration whereby to provide an automatic brief time delay between quarter, half and full speed control. The mechanical timing device prevents the operator from demanding of the traction motor too rapid an acceleration by providing a small assured increment of time between operational speeds to permit some acceleration of the motors to take place prior to higher speed demands at the master controller, whereby current peaks are reduced and the acceleration of the truck is made smoother.

I have also provided vastly improved anti-plugging means which operates normally to prevent a reversal in direction of travel of the truck when the truck is moving above a predetermined speed by interfering with any attempted actuation of the master controller above such speed, and which additionally is operable to prevent for a timed interval such a reversal in direction when the truck is traveling at less than said predetermined speed or even if it is stationary. The latter function is accomplished by blocking for a brief timed interval the speed control cam whenever it is returned to neutral position, regardless of whether or not the truck is moving. The above mentioned timing mechanism performs a dual function in that it also provides for this important additional anti-plugging protection, as will appear in detail later.

The vehicle brake control means, previously discussed, is associated with the master controller such that whenever the controller is returned to a neutral position the brakes are automatically applied. Thus, in combination with the anti-plugging means, whenever the controller is returned to a neutral position the brakes are applied for at least a timed interval, thus prohibiting the driver from inadvertently throwing the truck into a reversal in direction when he may be in fact attempting only to apply the brakes.

The above advantageous results relating to the use of improved anti-plugging and brake control means comprise additional objects of this invention.

As the description proceeds it will be seen that this invention provides not only brake control means which is operated from the master controller for the purposes aforesaid, but that the brake control is modulated to gradually release or permit application of, as the case may be, braking pressure as the master controller is actuated out of or toward a neutral position. It has been found in trucks of this type that an automatically modulated brake release or application is important in insuring that the brakes are applied smoothly.

An additional important object of the invention is, therefore, to provide a modulated brake control means which is operable as a function of the position of the master controller.

Still another object of the invention is to provide brake control means operating in conjunction with the truck speed control to provide a modulated control of braking system pressure.

These objectives are accomplished by providing a second control camming means which is utilized in conjunction with the speed control camming means and which is adapted to move with the speed control means in accordance with a predetermined schedule. The second camming means is operatively connected to the brake control hydraulic system in such a manner that it effects a modulation of brake release or brake application pressures as a function of the operative position of the speed camming means. Whenever the speed camming means is returned to a neutral position, the second or brake camming means is also returned to a neutral position in which, as pointed out above, the brakes are applied.

It is still another object of the invention to provide means for controlling maximum braking effort as a function of the load on the fork of the truck.

The accomplishment of the last mentioned objective is attained by providing additional brake pressure modulating means which is responsive to the pressure in the lift cylinder of the truck, which varies as a function of the load on the fork of the truck, whereby the braking "feel" experienced by the operator is substantially the same whether the truck is operating under full load, no load, or an intermediate load, it being understood that the amount of braking effort required for adequate braking of the vehicle when loaded would cause the unloaded vehicle to stop very suddenly. The present invention, therefore, provides the above means in order that the sensitivity of the braking control tends to remain substantially the same whether the truck is carrying a capacity load or no load.

My construction additionally provides both a slow and high speed load lifting power supply which greatly enhances the operating efficiency of the load lifting control system. To achieve this advantageous result I have provided for the use of two relatively small lift pumps and lift pump motors which are operated sequentially to achieve different lifting speeds, and which incorporate in the control circuitry thereof features for improving the efficiency of pump motor operation. Conventionally, a single relatively large lift motor-pump combination is utilized which operates inefficiently during slow speed lifting operation because the combination is operated at only a small fraction of its rating.

Heretofore, in narrow-aisle trucks utilizing an extendible and retractable mast construction it has been conventional to employ the same pump for reaching operations of the mast as is employed for lifting the forks. It has been found that far less power is required to accomplish reaching operations of the mast as is required for lifting purposes. Also, extension and retraction of the mast involves operation of the motor-pump for an appreciable period of time. As a result, an oversized motor-pump combination is normally utilized at a small fraction of its maximum horsepower, which inherently causes waste of substantial amounts of battery energy.

It has been found that the controlling means for accomplishing reaching operations of the mast can be uniquely combined with the dual lifting pump and motor construction in such a manner that only one of the available lifting motors and pumps needs to be utilized for this purpose, thus minimizing energy losses previously experienced in trucks of this type. In addition, the reach control circuitry is so designed that it always operates from one-half of the battery only, which is all that is required.

The reach control circuitry is also combined with the lifting control in such a manner that the operator can drive the truck in forward or reverse, cause the mast structure to be extended or retracted, and lift or lower the fork, all simultaneously, but never at more than a fraction of full speed travel of the truck nor above a relatively slow fork lifting speed, which is most desirable from a safety standpoint. At the same time, skilled operators are in no way limited in operating the truck at highest efficiency in performing various work cycles within the limitations of safety.

It is a general object of the present construction to provide a vastly improved type of industrial truck which provides means for combining various of the foregoing objects, features and advantages.

Construction and apparatus disclosed but not claimed in the present application are disclosed and claimed in my copending applications as follows: Ser. No. 161,592, filed December 22, 1961; Ser. No. 161,687, filed December 22, 1961; Ser. No. 161,966, filed December 26, 1961; and Ser. No. 161,972, filed December 26, 1961; all of said copending applications constituting divisions of this present application.

Many other important objects, features and advantages of the present invention will appear in the detailed description which follows when taken in conjunction with the accompanying drawings, wherein:

FIGURE 1 is a side elevational view showing the general arrangement of an industrial lift truck of a type which may utilize the features of the present invention to particular advantage;

FIGURE 2 is a plan view of FIGURE 1;

FIGURE 4 is an enlarged view of a portion of FIGURE 3; it illustrates the master controller and certain related elements in greater detail;

FIGURE 5 is a view taken substantially along line 5—5 of FIGURE 4;

FIGURE 6 is a schematic wiring diagram which illustrates the operative relationship of various electrically and mechanically controlled elements in a preferred circuit;

FIGURE 7 is a timing chart illustrating the speed positions of the master controller at which various ones of a plurality of master switches are actuated;

FIGURE 9 is an enlarged detail view of the hydraulic braking system, the mechanical portion thereof being illustrated in FIGURES 3, 4 and 5;

FIGURE 10 is a perspective view of a power steering system which may be utilized in the present invention; and FIGURE 11 is an enlarged schematic view illustrating in greater detail a portion of the control system of FIGURE 3.

Figure 3:
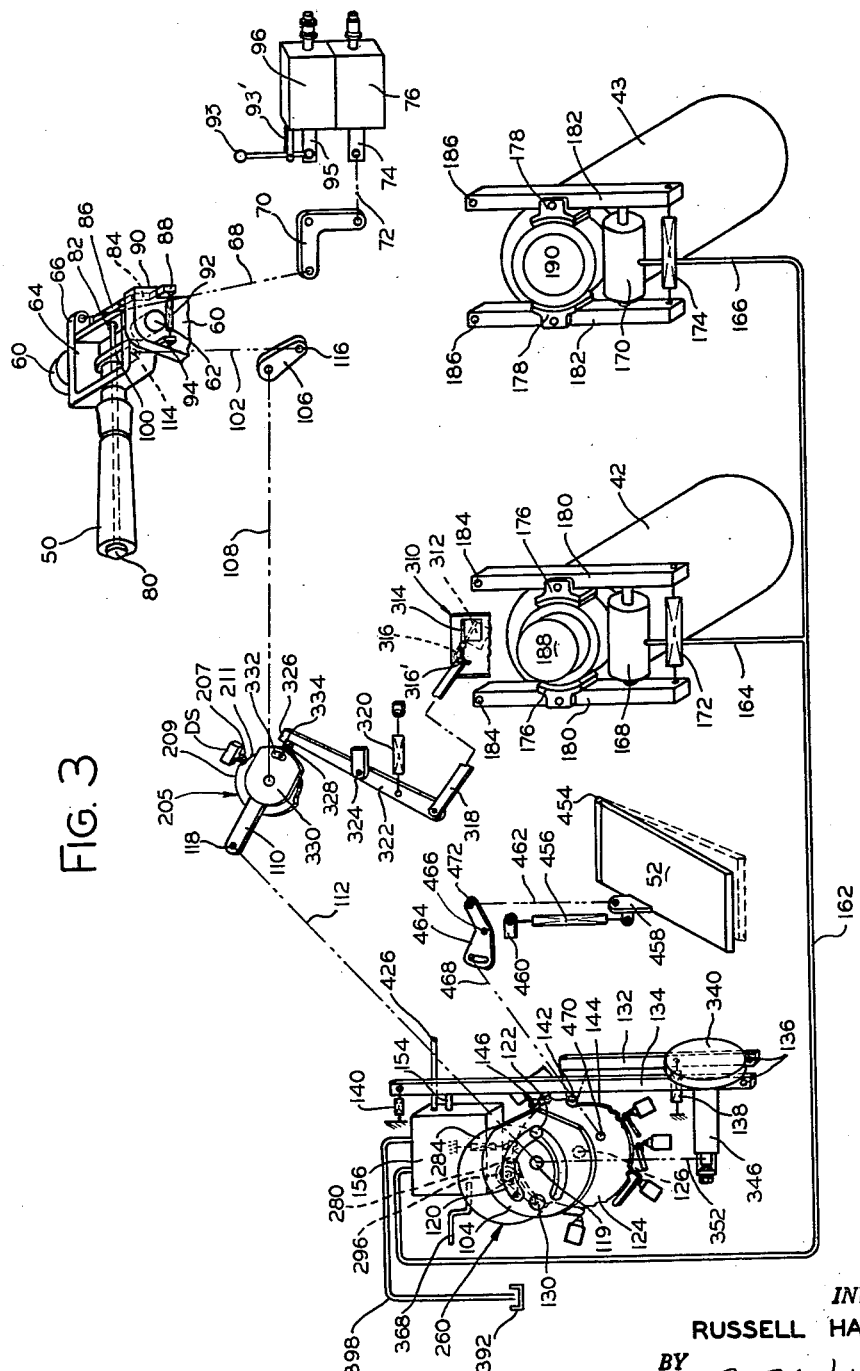
FIGURE 3 is a schematized perspective view of various of the control elements which form a part of the present invention; it illustrates the general arrangement of various of the control elements in cooperating relationship.

Referring now in detail to the drawings, and first to FIGURES 1 and 2, the main frame of a wheeled truck is generally in the form of a U-shape, the projecting legs of which are transversely spaced apart. Each outrigger leg consists of a longitudinally extending channel construction 10 upon each of which is mounted a ground engaging wheel 12. The opposite ends of the legs are secured together and the space therebetween is bridged by means of transverse frame members. A lifting mast mechanism of known construction is illustrated at numeral 14 and comprises generally a pair of laterally spaced outer fixed channel members 16, a pair of laterally spaced I-beams 18 suitably nested within the channel members for vertical telescoping movement, a hydraulic cylinder lifting motor 20, and a lifting carriage 22 mounted in known manner for vertical movement relative to members 18 and connected to hoist motor 20 by means of a pair of chain and sprocket mechanisms 24. Transverse brace means 26 tie together, channel members 16 for rigidifying the mast structure. A pair of fork tines 30 are supported upon carriage 22.

The mast structure 14 is suitably connected by means of a pair of rearwardly extending L-shaped brackets 32, only a portion of one of which is illustrated, to the channel members 10 for longitudinal movement relative thereto. Each member 32 is secured to a lower side portion of one of channel members 16 and mounts the upright upon the channel members by means of a pair of rollers located adjacent the opposite ends of each L-shaped bracket and in rolling abutment with inner and outer surfaces of the upper flange member of each channel construction 10. An upper one of such pairs of rollers is illustrated at numeral 34. The bracket members 32 are associated with a worm gear mechanism, not shown, located within each channel member 10 so that as the worm gears are rotated in one or the other directions the mast 14 is actuated longitudinally outwardly or inwardly of the legs, as illustrated in FIGURE 1. Suitable motor means and driving mechanism, not shown, are mounted within a housing construction 36 for driving the worm gear mechanisms, and thereby the mast construction. The mast construction 14 is disclosed and claimed in copending U.S. application Serial No. 760,744, filed September 12, 1958, in the names of Hastings and Backofen (common assignee), now abandoned and continued in application Ser. No. 111,070, filed May 18, 1961.

Suitably mounted within the framework of the truck and housed within the rear corner portions of body 36 is a pair of dirigible wheels 38 having power steering control mechanism associated therewith (FIGURES 9 and 10), controllable by means of a steering tiller 40. The linkage connection between tiller 40 and the traction wheels is described in detail in my aforementioned copending application Serial No. 818,678. The dirigible wheels comprise also traction wheels and are associated with electric motors 42 and 43. Motors 42 and 43 as before explained, are constructed for opposite rotation, one relative to the other, whereby to neutralize reaction torque which would otherwise be required to be compensated for at steering tiller 40, or in some other manner. As pointed out above, the driving-steering-motor combination is disclosed and claimed in my copending application Serial No. 818,678.

A generally U-shaped operator's station 44 is located at the after end of the truck and is formed between rearwardly extending leg portions 46 of control and body housing 36. The operator's platform 44 comprises a fixed portion 48 and a pivoted parking brake portion 52, which will be referred to more specifically later herein. Located on the right hand side of the truck atop body portion 36 is a main operator's control handle 50, which will be described in detail hereinafter.

An overhead guard construction 56 is illustrated in FIGURE 1. It is mounted upon housing 36 and is adapted to protect the driver from injury which might otherwise result if an object were to fall from an elevated position above the operator's compartment.

The construction of the narrow-aisle truck has been described with reference to FIGURES 1 and 2 only in general terms, inasmuch as such construction per se does not comprise a part of the present invention except as may appear hereinafter relative to a more detailed description of the construction.

OPERATOR'S CONTROL

Referring now especially to FIGURE 3, the single operator's control handle 50 is adapted to control all functions of truck operation, as explained generally above, excepting steering of the truck, which is controlled by means of tiller 40, control of upright 14 in extension and retraction, which is effected by means of a switch to be described hereinafter in conjunction with electrical circuitry and power means therefor, and control of the parking brake, which is actuated by pedal 52 and associated with the master controller, but which is not controlled by handle 50. A pair of laterally spaced and upwardly extending mounting members 60 are supported upon the upper right portion of body housing 36, in each of which there is mounted a trunnion pin 62 which extends inwardly thereof for mounting thereon a vertically pivoted yoke 64. Control handle 50 is mounted upon the one end of yoke 64, which yoke includes at one side thereof an ear 66 having a pivoted link 68 extending downwardly therefrom to a pivotal connection with a bell crank 70 which is pivoted at its opposite end to a connecting link 72 of a valve plunger 74. A lifting and lowering valve means 76, the operation of which will be described later in conjunction with control circuitry of the lift motor and pump circuits, is adapted to control the operation of hoist cylinder motor 20. For the present it may be noted that inward movement of plunger 74 serves to first actuate a first pump switch and to open the valve 76 for energizing hoist motor 20 to lift fork tines 30. The initial movement of the valve plunger starts a first pump motor for slow speed lifting action. Further inward movement of the plunger to its travel limit then actuates another pump switch for high speed lifting action. Lowering movement of the forks is controlled by outward motion of plunger 74. An upward clockwise movement of handle 50 effects, through yoke 64 and linkage 68, 70 and 72, an inward motion of plunger 74 for controlling lifting action, whereas a downward counter-clockwise movement of control handle 50 has an opposite effect.

A situation wherein the operator might lurch forward and accidentally push downwardly on the control handle without intending that the forks be lowered is avoided in the utilization of a safety interlock button 80 which extends axially inwardly beyond handle 50 within yoke 64 and through an opening 82 in the yoke. A latching member 84 is pivoted on a hinge 86 at the one side of the yoke and includes a projection 88 which extends beneath an overhanging ledge 90 of the one supporting member 60. A spring 92 is connected to movable projection 88 and to a fixed projection 94 of support member 60 for normally holding latch 88 beneath ledge 90. This arrangement prevents control handle 50 from being actuated downwardly to induce lowering movement of the forks unless interlock button 80 is first depressed. Depression of the button causes latch 84 to pivot outwardly about hinge 82, whereby to permit the control handle to be actuated as aforesaid in order to control lowering of the forks.

The control handle may also be rotated in either direction about its own axis, which motivates a master controller to actuate control circuitry of traction motors 42 and 43 such that both the direction of travel of the vehicle, the speed of the vehicle, controlled braking of the vehicle, and various other interlocking and associated controller mechanism and circuitry is or may be motivated, as will appear later herein.

Before proceeding with a detailed description of the master controller and associated circuitry it is important to note that control handle 50 is mounted on the truck body so that it extends substantially transversely of the body of the operator when the operator is facing forwardly of the truck. Although, in association with the various control mechanisms, all of the foregoing operating functions are capable of being fully controlled merely by actuating the handle either upwardly or downwardly in a vertical plane or by rotating it about its own axis, the handle means 50 provides yet an additional function. It will be noted that the handle is rigidly mounted in a horizontal plane which lies transverse of the operator so that it provides a convenient means for steadying the operator during operation of the truck. The construction is such that the operator cannot push or pull the control handle forwardly or rearwardly of the truck. In other words, without danger of unintentionally effecting actuation of any truck control means, the operator is able to steady himself by means of the main control handle. Since one hand of the operator will be almost continuously located on the control handle during operation of the truck, it is most beneficial to his safety and convenience to incorporate the stabilizing means in the control handle construction.

A second control handle 93 is pivotally supported on an arm 93' and is adapted to actuate a valve plunger 95 for controlling a mast reach valving means 96 to actuate the mast 14 in extension and retraction, said valving means being adapted to energize a pump motor P1 by way of a valve plunger camming means 97 which is adapted to close a normally open switch RS (FIGURES 3, 6 and 11). It will also be noted that a camming means 98 is actuated by valve plunger 74 to successively actuate a pair of pump switches PS1 and PS2, which effects successive low and high speed lifting of the fork, as will appear in detail hereinafter in connection with the description of FIGURE 6.

MASTER CONTROLLER FOR TRAVEL AND BRAKING

Turning now to the details of the travel and brake controls, and especially to FIGURES 3, 4 and 5, control handle 50 is connected to a crank member 100 which extends within the yoke transversely of the handle member. The crank is pivotally connected at its other end to a vertical link 102 which is operatively connected to an upper control cam 104 of the master controller by means of a crank 106, a rotatable rod 108 which extends transversely of the truck within body 36, a vertically extending crank 110, and a rearwardly extending link 112. In order to facilitate the foregoing arrangement of mechanical linkage, spherical type joints are utilized at locations 114, 116, 118 and 119. The linkage of FIGURE 3 has been schematically represented in order to facilitate understanding. References to the directions rearwardly, forwardly and vertically relative to the linkage of FIGURE 3 pertain to the actual construction in relation to the truck.

The operator grasps the control handle 50 with his right hand. Rotation of the handle forwardly about its axis, i.e., in a counter-clockwise direction as viewed from the left end of the handle, causes the truck to move in a forward direction. Return of the handle to a neutral position effects application of the brakes. Rotation of the handle rearwardly about its axis, i.e., in a clockwise direction as viewed from the left end of the handle, effects reverse movement of the truck. This type of control is generally known as "directional control," which tends to make such controls instinctive on the part of the operator. The degree of such forward or rearward rotation of handle 50 determines the speed in forward or reverse, respectively, at which the truck will operate.

Upper cam 104 forms a generally U-shaped cam track 120 in which is closely fitted a cam follower 122. Follower 122 is mounted upon a lower cam 124 which is in turn supported by a vertical trunnion and bearing 126. Forward rotation of control handle 50 effects, through the above described linkage mechanism, a counterclockwise rotation of upper cam 104 about a vertical shaft and bearing support 130, whereas reverse rotation of handle 50 effects a clockwise movement of cam 104 about shaft 130. The shape of camming track 120 is such that rotation of cam 104 acts upon follower 122 to cause the lower cam 124 to rotate in a counter-clockwise direction about trunnion 126 irrespective of whether the upper cam rotates clockwise or counter-clockwise from a neutral position.

A pair of vertically spaced cam follower arms 132 and 134 are pivotally mounted to the frame of the truck about a common center 136. Springs 138 and 140 urge arms 132 and 134, respectively, in a counter-clockwise direction about common center 136. A cam follower roller 142 is connected to arm 132 and abuts a cam surface 144 of lower cam 124, and a cam follower roller 146 is connected to arm 134 and contacts a peak 148 formed between opposed slopes 150 and 152 of upper cam 104 when the master controller is in a neutral position, as shown. Cam follower arm 132 is a speed control arm and follower arm 134 is a brake control arm. Counter-clockwise rotation of lower cam 124 away from its neutral position causes cam follower 142 to always initially move up slope 144, while simultaneous movement of upper cam 104, either clockwise or counter-clockwise away from a neutral position, causes roller 146 on upper arm 134 to always initially move down one of the two slopes 150 or 152, thus permitting spring 140 to pull the one end of arm 134 in a counter-clockwise direction against a valve plunger 154 of a brake control valve assembly 156. As valve plunger 154 is moved inwardly of valve body 156 it compresses a spring 158 (FIGURE 9) which causes a regulating valve 160 to modulate in a predetermined manner an increasing brake release pressure in conduits 162, 164 and 166, which actuates brake cylinders 168 and 170 against the forces of brake applying springs 172 and 174 of the pairs of brake shoes 176 and 178, respectively. The pairs of brake shoes are mounted upon pairs of brake levers 180 and 182 which are mounted for pivotal movement in opposite directions about fulcrums 184 and 186, respectively, whereby the brake shoes are urged by the brake springs into braking relation with brake drums 188 and 190 located on a pair of drive shafts of the pair of traction motors 42 and 43. The details of the brake control system, including valve assembly 156 and its connection to hoist cylinder 20 and to the power steering booster cylinder, will be covered in conjunction with the description of FIGURE 9. Suffice it to say for present purposes that the hydraulic control portion of the brake system modulates brake release pressure in accordance with a predetermined schedule which it is the function of control cam 104 to provide. Gradual rotation of control handle 50 in either forward or reverse causes the brake release pressure to be modulated for a certain number of degrees of handle 50 rotation. An intermediate position of the control handle relative to the length of slope 150 or 152 holds the brakes continuously in a partially released position with the brake shoes 176 and 178 contacting the brake drums, but with diminished force. This type of control is required, for example, when the truck descends a grade at a constant speed.

Rotation of control handle 50 in a forward direction causes the upper cam to pivot in a counter-clockwise direction about shaft 130 causing roller 146 to follow slope 150, and reverse rotation of the control handle causes clockwise rotation of the upper cam and relative movement of roller 146 along slope 152. While cam follower 146 is on either surface 150 or 152 the force exerted by spring 140 induces a rotational force on cam 104 which tends to pull control handle 50 ahead of the position in which the driver intends to hold it. Conversely, when the driver attempts to return the control handle to a neutral position this force would necessitate the application of a force by the operator which would be tiring. In order to offset such undesirable force reactions on the upper cam, cam follower 142 is caused to simultaneously move upward or downward, as the case may be, on the equal and opposing slope 144 of lower cam 124; thus, the forces balance so that the operator can control forward and reverse travel of the truck with no more effort on his part other than to overcome the friction in the joints of the linkage mechanism. When it is considered that the control handle will normally be rotated many hundreds of times per day, the importance of minimizing the energy output required of the operator will be better appreciated.

When rotation of the control handle has actuated the upper cam to a position in which follower 146 has permitted arm 134 to fully depress valve plunger 154, the rotational force created by roller 146 ceases. At this time, in order to further rotate the control, the operator must exert a slightly increased effort, because follower 142 is still in abutment with slope 144. This arrangement affords the effect of a detent, and it is at this time that the truck control achieves a coast position. This is a desirable characteristic of the master controller because it affords the driver a positive "feel" in the coast position, thus making it easy for him to locate, thereby encouraging coasting operation which economizes on consumption of battery energy.

Further motion of the master controller away from neutral permits speed cam follower 142 to move successively into speed detents 200, 202 and 204, which represent speeds position 2, 4 and 6, or quarter speed, half-speed, and full speed, respectively (see FIGURES 7 and 8) which are the operational speeds of the vehicle. Motion of the cams beyond coast position involves continued light pressure of cam follower 142 against lower cam 124, but no contact at all between follower 146 and the upper cam 104 inasmuch as the upper cam follower is restrained from further movement toward its cam by valve plunger 154 which is located at its inward travel limit position.

Figure 8:
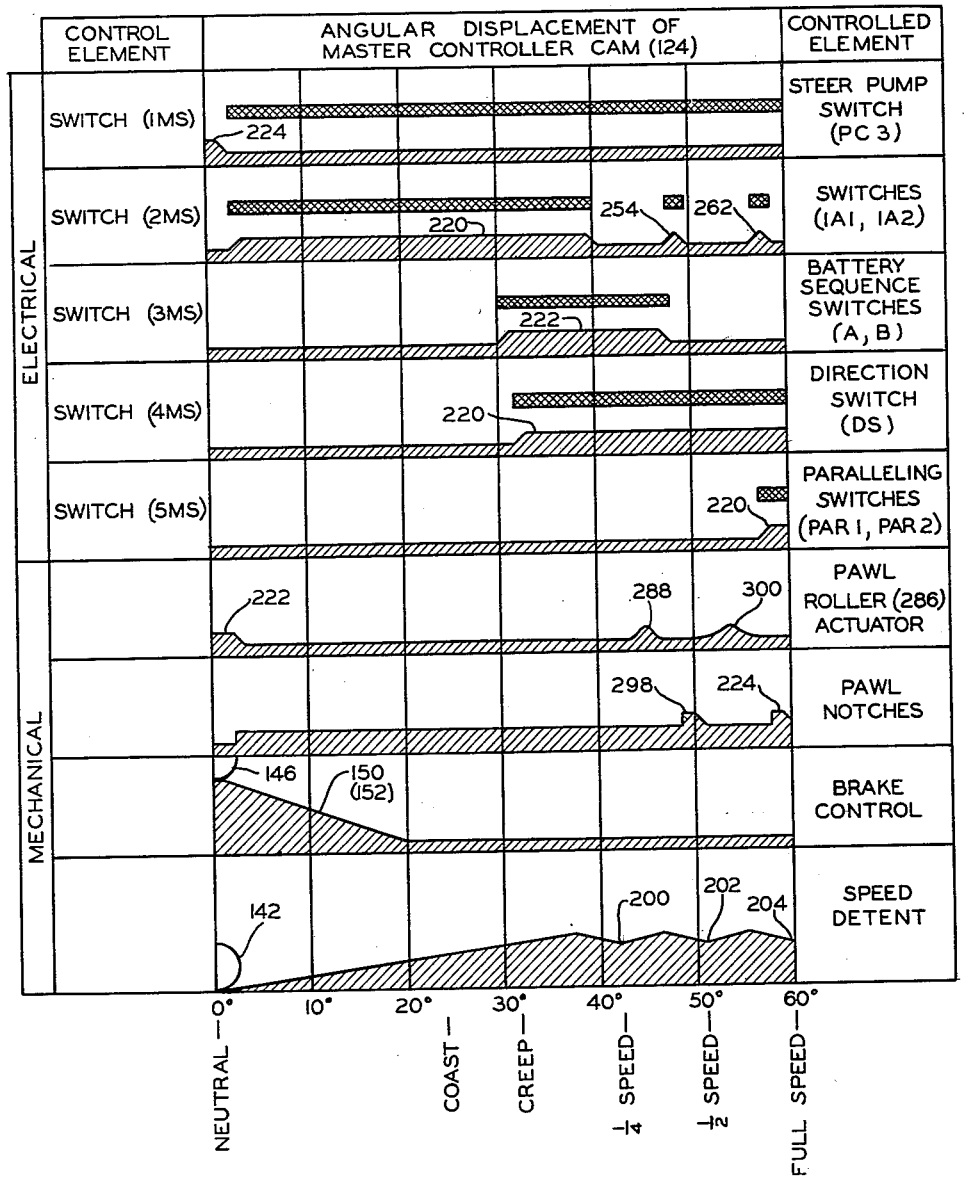
FIGURE 8 is a bar graph illustrating the operating relationships of the cams and switches of the master controller and the elements controlled thereby, as well as showing cam elements which form a part of the timing mechanism.

During motion of the speed controller cam from a neutral position to a full speed position, five master control switches, identified as 1MS, 2MS, 3MS, 4MS and 5MS, are actuated successively in accordance with the sequence of operation which is represented in the timing chart, FIGURE 7, and the bar graph, FIGURE 8.

Generally speaking, in none of the three operating travel speeds, viz, full speed, half speed and quarter speed, is any resistance used in the controller circuit (FIGURES 6 and 7). This type of speed regulation may be denoted as "voltage control" in contrast with "resistance control." As will be described in detail later, the speed is reduced from full speed to half speed by reconnecting the motors 42 and 43, also hereinafter designated M1 and M2, from a parallel to a series relation. Quarter speed is then achieved by utilizing only one half the battery with the motors still operating in series. Therefore, if a 24-volt battery is used, which is assumed herein for exemplary purposes, the net affect at quarter speed is to reduce the voltage impressed on each motor to 6 volts.

Use of only one half the battery immediately raises a question as to how unequal depletion of the charge in the various battery cells may be avoided. This is accomplished by an arrangement which I call a "battery sequence control." This mechanism employs a commercially available ratchet relay (AP11D Sequence Relay, Potter & Brumfield, Princeton, Indiana) so arranged in the circuit that each time switch 1MS is closed the sequence relay is energized, which functions to reconnect the opposite half of the battery. Thus, in normal operation, the laws of probability assure virtually identical usage of both halves of the battery inasmuch as a switching action normally takes place from one half of the battery to the other hundreds of times per day.

Of course, any specific values assigned to voltages and other items which may appear herein are intended to be exemplary only, and to facilitate understanding of my invention. It is not intended that the invention be limited in any sense to such specifics, which may, of course, vary with different operational requirements.

Before describing the details of the various circuits shown schematically in FIG. 6, it should be noted that a key operated ignition switch 492 is disposed in the circuitry. Throughout the remainder of this description it will be assumed that switch 492 is closed.

Turning now to a description of the various circuits that are energized for different speeds, both in forward and reverse, a double throw directional switch DS is adapted to be actuated by a cam 205 which is secured to crank 110. As illustrated, switch DS is located in a neutral position, as are all other elements of the control system in the various figures, and its cam follower 207 is located on a sloped portion of cam 205 which connects a raised portion 209 thereof with a depressed portion 211. Clockwise rotation of crank 110 for forward travel causes follower 207 to move towards the switch which places the switch in the circuit of the F1 and F2 coils of forward motor switches F1 and F2 (FIGURE 6). Counter-clockwise rotation of crank 110 for controlling travel in reverse actuates switch DS to its opposite contact which places it in circuit with coils R1 and R2 of motor reversing switches R1 and R2.

Switch DS is moved to its forward or reverse contact upon initial rotational movement of control handle 50. When switch 4MS is closed, which is in all speed positions of the controller (see FIGURES 7 and 8) switch DS closes the circuit to either the forward or reverse motor switches for controlling the direction of travel of the truck. When the paralleling switches PAR1 and PAR2, to be described in detail below, are positioned as shown in FIGURE 6, motors 42 and 43 are connected in series through the paralleling switches and the forward and reverse switches. It should be noted that each of the plurality of switch elements illustrated in FIGURE 6 are located in the position which each assumes when the control system is in neutral. Throughout the description which follows, except as may be otherwise indicated, operation of the truck will be assumed to be with switch DS in circuit with the R1 and R2 motor switches for reverse travel of the truck. This assumption is made, of course, for exemplary purposes only, and the mode of operation in a forward direction is the same excepting that handle 50 is actuated in the other direction which effects opposite actuation of switch DS for energizing motor switches F1 and F2, and not switches R1 and R2.

COASTING OPERATION

Movement of control handle 50 from neutral to coast position, as hereinbefore described, actuates master switches 2MS and 3MS to close, and de-actuates 1MS to close. Switch 2MS is actuated by raised cam portion 220, switch 3MS is actuated by raised cam portion 222, and switch 1MS, which is spring loaded in a closing direction, is de-actuated to close as projection 224 on cam 124 moves away from switch element 226.

Upon closing of switch 1MS coil PC3 is energized which closes steer pump motor contactor PC3, thereby starting steer pump motor 210, also designated P3. Switch 1MS remains closed at all times excepting when the controller is in neutral. Actuation of switch 2MS energizes coils 1A1 and 1A2 of switches 1A1 and 1A2, thus causing the normally closed contacts to open which inserts resistors R1 and R2 into the motor control circuitry. Closing of switch 1MS causes current to flow through coil BS of battery sequence switch BS, thereby moving it to its opposite contact. Actuation of switch 3MS causes current to flow through either coil A or B, thus causing the switch A or B to move from its normally closed position to the opposite contact, thereby making connection with the middle voltage terminal 230 of the batteries. In other words, each time switches 1MS and 3MS are closed upon movement of the controller from neutral to coast position, switches BS and A or B are actuated to place that half of the battery B1, B2 in the traction motor circuit which is opposite to the half just previously utilized. Thus, in an average day's operation in which this switching action will occur some hundreds of times, substantially equal use of the two halves of the battery is assured. It will be noted on the bar chart of FIGURE 8 that switch 1MS closes before switch 3MS, which assures that the battery sequence switch BS will operate prior to the flow of current through switch 3MS to the battery switch A or B.

It will be understood that each paralleling switch PAR1 and PAR2 is normally located as illustrated for series motor operation, and is not actuated to its opposite contact until switch 5MS is closed. When the latter switch closes, the paralleling switches are actuated to place the motors in parallel, but this action does not occur until speed 5 is selected, as described later.

*Speed 1*

Speed 1 is generally known in the industry as "inching" or "creep" speed, and is important in that it permits a lift truck operator to very slowly "inch" the truck in either direction during loading and unloading operations which may require careful spotting and/or selection of loads.

Control handle 50 is preferably marked for coasting operation and for speeds 1, 2, 4 and 6, for both forward and reverse, in order to facilitate operator speed selection. When the operator rotates handle 50 in reverse to select speed 1 the lower cam 124 is rotated an additional amount which has no effect on closed switches 1MS, 2MS and 3MS, but which causes switch 4MS to close by means of cam portion 220. Switch 4MS energizes, through the direction switch DS, reversing coils R1 and R2 (in accordance with the previous assumption), thereby actuating switches R1 and R2 to their opposite contacts.

Now with switches A and R1 and R2 actuated, current flows from the 12-volt connections of battery section B2 through lines 230 and 232, sequence switch A, resistor R1 (normally closed switch 1A1 having been previously opened by closure of switch 2MS), lines 234 and 236, switch R1, motor M1, switch F1, and thence through the motor field and paralleling switches PAR1 and PAR2 to switch R, motor M2, switch F2, line 238, resistance R2 (switch 1A2 having also been previously actuated by the closure of switch 2MS), and finally to the battery through unactuated sequence switch B.

With the motors thus operating in series on one-half the battery it will be seen that at speed 1 the truck is operated at approximately one-eighth voltage and one-eighth speed. Speed 1 is so slow that it is only used for inching purposes, as mentioned above, which is generally used for very short periods of time only, so that the resulting energy loss through resistors R1 and R2 occurs rather infrequently. More important, however, is the fact that in utilizing but one-half of the battery for series motor operation, the resistors must effect only a reduction of voltage at the motor terminals from approximately 6-volts to 3-volts, whereby conventional circuits in trucks of the type contemplated must reduce the voltage from 24-volts to 3-volts for inching operation.

During the transition from speed 1 to speed 2, during which switch 2MS is opened, a rectifier 250, in parallel with coils 1A1 and 1A2, permits a current which is caused by the inductance of these two coils to circulate for a fraction of a second, thus momentarily holding the 1A1 and 1A2 switches in the energized open positions. Thus, should the operator actuate the control rapidly from neutral to second speed position, a short time delay occurs in the first speed position which reduces the current peak that would otherwise occur should the 1A1 and 1A2 switches close immediately.

*Speeds 2 and 3*

Switch 2MS having opened for speed 2 operation, and the circulating current in the aforementioned coils having been dissipated, the 1A1 and 1A2 switches resume their normally closed positions, thus by-passing resistors R1 and R2. Speed 2 represents a one-quarter speed operation of the truck in which each motor operates at 6 volts.

Speed 3 represents a transitional speed between operating speeds 2 and 4. Actually, two transitional effects take place between speeds 2 and 4, i.e., a first transition from speed 2 to speed 3 and a second transition which is designated speed 3. As the operator actuates control handle 50 from speed 2 toward the one-half speed position 4 the first transitional effect which occurs is the opening of switch 3MS as controller cam 124 is rotated to a counter-clockwise position wherein raised surface 222 leaves the follower of switch 3MS. When switch 3MS is first opened the inductance of the contactor coil A causes a current to circulate for a fraction of a second through a rectifier 252, thus holding switch A momentarily in its actuated position against the right hand contact thereof so as to assure that switches 1A1 and 1A2 will have sufficient time to become actuated by the reclosing of switch 2MS, which is effected by projection 254 of the cam prior to the movement of switch A to its left hand contact. In other words, resistances R1 and R2 are again momentarily introduced into the circuit prior to movement of switch A, thus reducing the amount of current which must be interrupted and consequently minimizing the intensity of the arc which normally occurs when a switch is opened. Furthermore, when switch A is in flight between its right and left hand contacts (which would ordinarily interrupt the circuit), the current through the motors M1 and M2 is maintained by means of a rectifier 256 which by-passes switch A, thus assuring continuous and uninterrupted current flow through the motors, as well as relieving switch A of the duty of interrupting the current.

When switch A has reached its left hand, or de-actuated, position the truck is operating momentarily in transitional speed 3 with current flowing from the 24-volt connections of the battery through the two motors in series, and through resistors R1 and R2. At speed 3 the master controller may be mechanically stopped for a timed interval of very short duration by a timing device 260, hereinafter described in detail, which assures that there will be time for some acceleration to take place in speed 3 before the operator can actuate control handle 50 to a speed 4 position. The circled check mark in the 2MS column of FIGURE 7 for speed 3 represents a timed interval which is effected by the timing device. Thus, again, the beneficial effect previously described relative to speed 1 operation occurs, whereby current peaks are reduced and the acceleration of the truck is made smoother.

The duration of operation in speed 3 preferably occurs over a fraction of a second only, whereby the total energy lost through resistors R1 and R2 is very small. As described previously with reference to speed 1 operation, this energy loss is small not only because of the shortness of duration of operation in speed 3, but also because the resistors R1 and R2 are required at this point only to reduce the voltage at the motors from 12-volts to 9-volts, not from 24-volts to 9-volts, as is the case in conventional resistor speed controls.

*Speeds 4 and 5*

As the truck accelerates during the timed interval in speed 3, the timing mechanism permits switch 2MS to be re-opened upon further slight rotation of cam 124 which moves switch 2MS between projections 254 and 262, and again effects a de-energizing of coils 1A1 and 1A2, thereby de-energizing and closing switches 1A1 and 1A2 and by-passing the resistors R1 and R2. The truck is now operating with no resistance in the circuit and with 12-volts across each motor.

During the transition from speed 4 to speed 5 switch 5MS is closed by raised portion 220 of the cam and energizes paralleling switch coils PAR1 and PAR2 which causes each corresponding paralleling switch to be actuated toward its opposite contact. While the contact finger of each paralleling switch is in flight, the current through motors M1 and M2 is not interrupted because of the use of a by-passing rectifier 266 which momentarily maintains the current flow. Again, the objective of minimizing the intensity of arcing at the paralleling switches, as well as providing uninterrupted current flow to the motors, is attained.

While the paralleling switches are in flight, switches 1A1 and 1A2 are likewise being actuated to an open position as the result of 2MS being closed momentarily by cam projection 262. However, the camming design is such that the 1A1 and 1A2 switches are energized to open while the paralleling switches are in flight so that when speed 5 is first demanded the circuit and camming design assures that the resistors R1 and R2 are in circuit prior to motors M1 and M2 being connected in parallel to 24-volt supply.

At transitional speed 5 the master controller is again momentarily interrupted by the timer mechanism and held in this position for a fraction of a second. Again, the circled check mark in FIGURE 7, column 2MS at speed 5, is intended to represent a timed interval. Again, the energy loss resulting from the momentary use of resistors R1 and R2 is very small, because the duration of operation at speed 5 lasts only a fraction of a second.

In speed 5 switches PAR1 and PAR2 have been actuated to the opposite contacts by the closing of switch 5MS whereby to place the drive motors in parallel relation. Thus, in speed 5 condition, the current flow through motor M1 is from the positive terminal of battery section B1 through switch A, resistor R1, switch R1 (for speed 5 operation in reverse), the motor, switch F1, switch PAR1, and lines 270 and 272 to the negative terminal of battery section B2. The current flow through motor M2 is from battery section B1 through switch PAR2, switches R2 and F2, line 238, resistor R2, and switch B.

The use of two 1A switches, i.e., switches 1A1 and 1A2, instead of only one is an important feature in that in speeds 5 and 6 when motors M1 and M2 are operating in parallel relation the correct resistance is provided for each motor since the resistors R1 and R2 are in separate circuits, whereas, in speeds 1 and 3 the resistors were in series with each other. It should also be noted that the location of the 1A switches is such that neither switch is at any time required to carry the total current flow of both traction motors when the motors are connected to 24-volts. Instead, switch 1A1 and 1A2 each carries only the current of a single motor when it is connected to 24-volts. The same beneficial result occurs in the use and location of switches A and B.

*Speed 6*

This speed represents full speed operation of the truck at about 6 m.p.h., in which additional counter-clockwise movement of cam 124 effects a re-opening of switch 2MS, whereby switches 1A1 and 1A2 return to normally closed positions, thus removing resistors R1 and R2 from the circuit and with each motor operating at 24-volts.

TIMING DEVICE

The mechanical timing device 260 referred to above includes a pawl 280 which is journaled on a pivot pin 282 and urged in a counter-clockwise direction by a light spring 284 which maintains a cam follower roller 286 against the lower cam. When cam 124 is rotated counter-clockwise, roller 286 first moves down a slope 304 and thence along cam surface 287 until it encounters a projection 288 on the camming surface which moves the pawl rapidly in a clockwise direction, assuming rapid rotation of cam 124, thus causing a projecting end 290 of the pawl to be turned clockwise. Simultaneously such rapid clockwise rotation of the pawl causes a balance wheel 292 to rotate clockwise as the roller end of the pawl engages a pin 294 which projects vertically upwardly from the balance wheel which is located in a plane beneath the lower cam 124. The momentum imparted to the balance wheel as a result of pin 294 being struck by the pawl with substantial force, causes it to continue its clockwise rotation against the action of a spiral spring 296 which has an initial tension sufficient to create a rotational force slightly in excess of the rotational force caused by spring 284. The spring 296 is connected at its outer end to the pin 294 and at its inner end to the pawl. Thus, the momentum of the balance wheel causes it to continue to rotate several degrees in a clockwise direction which action also moves the pawl in the same direction through the medium of spring 296, thereby actuating the projecting end 290 of the pawl into contact with the lower cam and into a position to block further counter-clockwise rotation of said cam as pawl end 290 engages a cam tooth 298.

It will be recalled that when the cam is located in speed 3 position the switch 2MS is prevented from closing for a brief increment of time. It is this action of the timer mechanism which momentarily blocks counter-clockwise rotation of the lower cam at the speed 3 position. Of course, the balance wheel ceases its clockwise rotation after moving a few degrees and then rotates counter-clockwise to its initial position as a result of the action of the spiral spring 296. The balance wheel preferably is designed to return to its initial position in a fraction of a second, and the vertical pin 294 which is rigidly mounted on the balance wheel then strikes pawl 280 thus actuating it counter-clockwise and out of engagement with tooth 298. At this moment the master control cams are free to be actuated to the next speed position. As a practical matter, the operator may not be required to exert any effort to actuate the controller to the speed 4 position inasmuch as the position of speed cam follower 142 is on the slope which leads into speed detent 202, which tends to cause the controller to move itself into the speed 4-position.

The above sequence of events is repeated as the controller is actuated to speed 5 position by virtue of the roller 286 encountering a second projection 300, which causes pawl end 290 to engage tooth 224 on the lower cam.

It is important to understand that a relatively slow rotation of control handle 50 will not cause the timing device to function as above described, which is desirable, inasmuch as a relatively slow movement of pawl roller 286 over projections 288 and 300 will not impart to the pawl sufficient velocity in a clockwise direction to, in turn, impart to the balance wheel through pin 294 sufficient momentum to carry the pawl into momentary locking engagement with either tooth 298 or 224. In FIGURE 8 it will be noted that projections 288 and 300 lead by a few degrees the teeth 298 and 224, and pawl end 290 will therefore clear the teeth during cam rotation unless the cam is rotated sufficiently rapidly by control handle 50 to cause the pawl to strike pin 294 with sufficient force to impart the aforementioned momentum to balance wheel 292, which will then carry the pawl a few degrees in a clockwise direction effecting successive momentary locking engagement with teeth 298 and 224. In other words, the operator is permitted to accelerate the truck without interference by the timer device up to a certain predetermined rate, but not above such rate. If desired for operator convenience, the rate of demand for acceleration by the operator can be limited generally in the same manner, but without physically interfering with continuous rotation of handle 50.

A centrifugal fly-ball type governor mechanism is illustrated schematically at numeral 310 in FIGURE 3. It is adapted to be mounted on an extension of one of the motor drive shafts and, in response to motor speed, moves from a non-actuated position 312 to an actuated position 314 when the truck is traveling at more than one-half mile per hour, for example, either in forward or reverse, regardless of whether this travel speed is the result of motor torque, coasting operation of the truck, or operation of the truck on a grade. Movement of the speed responsive element from the position illustrated at numeral 312 to that at 314 causes a projection 316 of the element to pivot to the solid line position at 316. Such movement of projection 316 permits a link 318 to move in a downward direction under the action of a spring 320, which is connected to a lever 322 fulcrumed at 324 on the frame of the truck. The one end of lever 322 terminates in an upwardly projecting dog 326, which moves into abutment with a projection 328 on a yoke 330 which has a lost motion connection with crank 110, thus momentarily block rotational movement of control rod 108 from a forward position to a reverse position, or vice versa. The yoke 330 is journaled at the end of link 108 for limited lost motion relative to crank 110, the extent of such motion being fixed by a slot 332 formed in the yoke in registry with a pin 334 which is secured to crank 110. The lost motion arrangement between yoke 330 and crank 110 permits dog 326 to block and hold the yoke, and therefore the master controller, at precisely the neutral position of the controller regardless of whether the controller is being returned to neutral from either a forward or reverse position, assuming, of course, that the truck is moving at more than one-half mile per hour, thus positioning dog 326 in blocking position relative to projection 328.

The above anti-plugging mechanism has been found to function excellently in all ordinary cycles of truck operation, but if the truck happens to be operating up a grade at less than one-half mile per hour and the operator attempts to apply the brakes by rapidly returning the master controller to a neutral position, no anti-plugging protection is present since the dog 326 has not been actuated by centrifugal device 310 into interfering relation with projection 328. Thus, under the assumed condition, instead of applying the brakes as intended by the operator, the truck could be inadvertently put into reverse operation, which could be dangerous under the circumstances.

The timing device 260 has therefore been designed to provide an additional and equally important function to that set forth previously. It prevents the possibility of loss of any desirable anti-plugging protection when the truck is operating at less than one-half mile per hour.

It will be noted that when the master controller is returned to a neutral position, pawl roller 286 engages a slope 304 of raised cam portion 222. If the control handle 50 is at this time being actuated at a relatively rapid rate, as assumed in the foregoing situation in which the truck is operating up a grade, pawl end 290 is actuated in a clockwise direction beyond its illustrated position by the balance wheel 292 and into locking engagement with a notch 306 provided in the lower cam, thus blocking any immediate counter-clockwise rotation of cam 124.

The timer device therefore provides additional anti-plugging protection, but only when needed, when the master controller is returned rapidly to a neutral position, regardless of whether the truck is moving or not. Thus, the driver is prevented from inadvertently throwing the truck into a reversal in direction, when in fact he intends to apply the brakes. It will be understood that the timer device performs its anti-plugging function for a brief timed interval only, the same as during acceleration of the truck in speeds 3 and 5, as previously described.

Thus, the timer device serves the dual purpose of providing a timed interval in speeds 3 and 5, as well as providing a timed interval when the master controller is rapidly returned to the neutral brake-applied position. The timer device and the centrifugal actuator 310 cooperate to provide complete anti-plugging protection under all conditions of truck operation.

AUXILIARY DRIVE CONTROL

In order to simplify operation of the truck in reverse and to increase the driver's visibility under this condition, I have provided an auxiliary drive control knob 340 which is located in the left rear corner portion of the operator's station. A spring 344 urges the knob outwardly on a shaft 342. The shaft 342 extends through a supporting housing 346 and at its opposite end is connected to a vertical crank 348, at the upper end of which is a ball joint 350 which connects the crank to a control rod 352. Rod 352 is connected to the upper control cam 104 at a ball joint 354, which is located below and coaxial with the ball joint connection 119 of main control rod 112.

The auxiliary control knob is rotatable for both forward and reverse drive, i.e., in a clockwise direction for forward drive, as viewed from the operator's station when facing the control knob, and in a counter-clockwise direction for reverse drive. All speed and travel control functions associated with operation of the main control handle 50 are also effected by means of the auxiliary drive control knob 340, inasmuch as the auxiliary control linkage is not only connected to the master controller cams in the same manner as handle 50, but also because rotation of knob 340 acts upon the main control linkage, including, for example, crank 110 and yoke 330 for anti-plugging protection.

MAIN BRAKING SYSTEM

Referring now especially to FIGURE 9, which illustrates in schematic detail the hydraulic portion of the braking system, the main brake valve assembly generally is illustrated in cross section at numeral 156. As explained hereinabove, the operation of the brakes is of a "fail safe" variety in which the pressure against the brake drums 188 and 190 associated with the drive shafts of motors 42 and 43 is applied through brake shoes 176 and 178 by the brake springs 172 and 174. In FIGURE 9 only one motor-brake assembly is shown, it being understood that the other motor-brake assembly operates in the same manner and is controlled by valve assembly 156 the same as is the brake illustrated.

To release the brake, it will be recalled, it is necessary to apply pressure within brake cylinder 168 of sufficient magnitude to cause the brake shoes to pivot outwardly in opposite directions about shoe support pins 184 and against a pair of stops 360. This pressure is maintained so long as the master controller is located in any travel position between coast and full speed, in both forward and reverse.

In order that the brakes may be applied smoothly it will be recalled that the brake valve control arm 134 moves under the control of upper cam 104 and along cam slope 150 or 152 during a predetermined number of degrees of rotation of the master controller in forward or reverse travel, respectively, to modulate the action of the brake arm against valve plunger 154. It may at times be required to bring the truck to a sudden stop, at which time cylinder 168 pressure must be released quickly; this is accomplished simply by rotating the master controller rapidly to a neutral position, which, as a practical matter, substantially avoids normal brake modulating action.

The brakes are hydraulically released from the same source of fluid pressure which operates a power steer cylinder 362. A power steer control valve is illustrated schematically at numeral 364; it controls the flow of pressure fluid to either end of the cylinder 362 and returns the fluid discharged from the opposite end thereof to a sump 366 by way of conduit 370. The steer motor and pump 210 and 212 function to supply pressure fluid through conduit 368, it being recalled that the pump is operative whenever switch 1MS is closed, which occurs at all positions of the master controller, in either direction, out of neutral. Conduit 368 also communicates with a port 372 in the body of valve assembly 156, whereby the braking system is continuously supplied with fluid at steer cylinder pressure whenever the master controller is actuated out of a neutral position.

When the brakes are fully applied in neutral, a minimum fluid pressure is directed to cylinder 168. Under this condition valve plunger 154 is in the position illustrated, which permits the floating spring 158 to remain in a relatively relaxed condition and the regulator or modulating valve 160 to seat with a small force against the end of a fluid passage 374. This permits pressure fluid entering at port 372 to flow through passages 376 and 378 in a spool valve 380 and thence through an unrestricted passage 382, an annular passage 384, ports 386 and passage 374 (formed in a valve body sleeve insert 388), into a conduit 390 by way of modulating valve 160, and thence to a sump 392 by way of a second modulator valve 394 which opens conduit 390 to the sump through conduits 396 and 398. Pressure fluid between valves 160 and 394 also flows into a chamber 400 atop control valve 380 by way of a chamber 402 and a passageway 404. It will be understood, of course, that pressure fluid upstream of valve 160 flows into chamber 406 of the brake cylinder 168 by way of conduits 162 and 164, as well as to the brake cylinder of the other brake, but that the pressure level controlled by modulating valve 160 is not sufficient under the condition mentioned to overcome the brake applying force of spring 172, although it tends to "soften" braking force as described later.

When it is desired to release the brakes, valve plunger 154 will be actuated inwardly of chamber 402 upon rotation in either direction of upper cam 104, thus compressing spring 158 against valve 160 to regulate a pressure of, for example, approximately 65 p.s.i. within the brake system. The fluid flowing into conduits 374 and 382 from port 372 is thus applied to the brake cylinders at the pressure regulated by valve 160, which causes the brake pistons to extend outwardly in opposite directions until the brake shoes contact stops 360. Excess pressure fluid from the steering system flows to sump 392 through valve 160, conduit 390 and valve 394.

When it is desired to apply the brakes, plunger 154 is permitted to move outwardly a sufficient amount to relax spring 158 and thus reduce the pressure regulated by valve 160 as desired until the required amount of braking force is obtained. In this respect, it will be recalled that rapid movement of the main control handle 50 or auxiliary control knob 340 to or from a neutral position effects a substantially instantaneous brake application or release, respectively, while less rapid rotation of either operator's control member will modulate the application or release of braking pressure, as desired. It will also be recalled that the driver effort required in controlling the brakes is minimized by the utilization of cam follower speed control roller 142 on lower cam surface 144 compensating the action of follower 146 on upper cam surfaces 150 and 152.

Power steering system pressure may at times attain a level of approximately 800 p.s.i., for example, which, unless otherwise restricted, would result in a flow of an excessive quantity of fluid into the braking system past valves 160 and 394 to the sump 392, which would make steering difficult or impossible unless this loss of high pressure fluid is in some manner limited. To limit the flow from the steering system there is provided a passageway 410 in which is located a relatively small restriction 412 communicating with annular chamber 384. Spool valve 380 is normally held in the position illustrated by a spring 414 in chamber 400, the rate of the spring being designed to maintain the spool in said position until the pressure in conduit 368 rises, say to approximately 85 or 90 p.s.i. At this time the spool valve 380 will be actuated upwardly against spring 414 so as to disconnect passage 387 from conduit 382 and connect it to conduit 410. Restriction 412, of course, limits the quantity of oil which can flow through port 372 under such conditions, and thereby serves to assist the power steering system in that the quantity of pressure fluid which is bypassed to the brake system is carefully regulated.

The weight of a truck with a capacity load on the fork is normally approximately twice the weight of the empty vehicle, and the amount of braking effort required for adequate braking of the vehicle when loaded would tend to cause the unloaded vehicle to stop very suddenly and would be somewhat inconvenient to control, inasmuch as the sensitivity of braking control would tend to increase as the load on the fork was decreased from capacity to no load. A secondary modulating valve 394 has been incorporated in control assembly 156 in order to compensate for this undesirable characteristic, and, secondarily, to "soften" braking force. The lift cylinder 20 is represented in the upper left hand corner of FIGURE 9, and it includes an extensible piston head and rod assembly 418. The lift cylinder receives pressure fluid from the main hydraulic system, not shown, by way of conduits 420 and 422, which pressure fluid is also communicated to a chamber 424 by way of a conduit 426. A piston 428 extends upwardly through a sleeve 430 into chamber 424 and downwardly through a spring retainer 432 into a chamber 434 in which is located a pair of springs 436 and 438, spring 436 being held between a shoulder formed in chamber 434 and the retainer 432, and spring 438 extending from the retainer downwardly through an extension 440 of the chamber 434 into abutment with a flange 442 of modulating valve 394. The modulating valve 394 is adapted to seat in passageway 443 and is urged toward its seated position by a spring 444 in conduit 396. When valve 394 is opened against the force of spring 444 pressure fluid can flow from conduit 390 through passageway 443 into a chamber 446, and thence through radial ports 448 into conduits 396 and 398 to sump 392.

As shown, piston 428, which includes an enlarged center portion 450 bearing against retainer 432 and sleeve 430, is in its normal position for no fork load, which permits the spring 438 to remain in an extended condition, whereby spring 444 is permitted to apply effectively substantially its full compressive force against valve 394, thereby regulating a maximum specified pressure in passage 390. It is this maximum pressure which, under no fork load and a neutral position of the master controller, is applied against the downstream side of valve 160, thus helping to regulate the pressure in conduit 374, and therefore the maximum force of brake shoes 176 against the brake drums, which tends to soften the braking action as related to a zero pressure in the brake cylinders.

As the pressure in the base end of the lift cylinder 20 increases under loading of the fork, piston 428 will be depressed inwardly against springs 436 and 438, thus increasing the force of spring 438 against modulating valve 394, which increasingly reduces the effect of spring 444 on the valve. Thus, the pressure in conduits 390 and 374 is reduced to the extent of the increase in compression of spring 438, which is a function of the load on the fork, resulting in a decreasing residual pressure in the brake cylinders at a neutral position of the master controller and as the load on the fork increases. Under such a condition, brake applying spring 172 will increase the braking force of the shoes against the brake drum, again as a function of the load on the fork. This functional relationship exists until such time as the force applied by spring 438 against valve 394 is equal to the force applied in an opposite direction against said valve by spring 444, at which time the residual pressure in conduits 390, 374 and 162 decreases to a substantially zero pressure, following which no further increase in braking force can be obtained.

It will now be understood that the effective braking effort at the brake shoes increases as a function of the load on the fork, thus providing at all times a smoothly operating braking action. At maximum fork load a maximum braking force is obtained, and at no load a minimum braking force is obtained. Preferably, the design of the hydraulic portion of the braking system is such that substantially the same braking "feel" is experienced by the operator whether the truck is operating at no load, full load, or some intermediate load.

PARKING BRAKE

Whenever the operator dismounts from the truck it is important that the brake should be automatically applied for safety purposes. As mentioned earlier, pedal 52 has been incorporated in the floor portion of the operator's station to provide this function.

Referring now to the parking brake construction in greater detail, best illustrated in FIGURE 3, pedal 52 is pivoted about shaft member 454, and a relatively light tension spring 456 is connected to a pedal bracket 458 and a truck frame bracket 460 so as to raise the pedal 52 whenever the operator leaves the truck. The action of spring 456 should not be confused with the relatively stiff brake spring action of conventional narrow-aisle trucks. With the instant arrangement no special effort is required by the operator to hold pedal 52 in the down position, and therefore no driver fatigue is experienced as a result of this requirement. As the spring lifts the pedal, a connecting link 462 moves upwardly which causes a bell crank 464 to rotate about fulcrum 466 and, as shown schematically in FIGURE 3, operates a link 468 which is connected at 470 to the lower cam to rotate same in a clockwise direction and return it to its neutral brake-applied position. When the operator first gets on the truck and depresses pedal 52 the linkage does not affect the position of cam 124 inasmuch as a lost motion arrangement is provided in the linkage which does not cause movement of link 468 when the pedal is moved downwardly.

In FIGURE 4 the actual construction is illustrated wherein the link 462 is connected to the bell crank 464 at ball joint 472, the bell crank fulcrum being located at 466 which effects rotation of the crank as link 462 moves upwardly. The upwardly extending arm of the bell crank has at its upper end a ball joint connection 474 which is connected to a lost motion compression link 476, the link being connected by means of another ball joint 478 to the lower cam. Upward motion of the pedal 52 causes a movement of compression link 476 which drives the lower cam in a clockwise direction to return it to its neutral brake-applied position, but link 476 permits the pedal to be depressed without any resulting motion of the cam, i.e., connection 474 merely moves away from connection 478 which opens a space in the telescoping link 476.

LIFT PUMP MOTOR CIRCUITS

It will be recalled that the lift and lower control was rather generally described hereinabove under the heading "Operator's Control" in conjunction with the operation of control handle 50, which description included the operation of the safety interlock button 80 requiring a separate action on the part of the operator to effect lowering movement of the forks. It will also be recalled that initial movement of the lift and lower valve assembly 76 by plunger 74 effected actuation of a switch PS1 to open the valve for slow speed lifting through the energization of pump motor P1, and that further motion of the valve plunger to its travel limit actuated pump switch PS2 for high speed lifting.

Referring now again particularly to the circuit of FIGURE 6, closure of switch PS1 upon initial movement of valve plunger 74 energizes coil PC1, which closes normally open switch PC1 starting lift pump motor P1, which then supplies pressure fluid to hoist cylinder motor 20 for relatively slow speed lifting operation. In addition, closing of switch PS1 causes current to flow through lead 480, a rectifier 482, and the battery sequence switch BS to one of the 12-volt battery tap coils A or B. As is known, a normally closed switch will open sooner than a normally open switch closes, providing that both switches have equal speed of response. Consequently, simultaneous energization of switch PC1 and switch A, for example, causes the normally closed contact of switch A to open before the normally open contact of switch PC1 closes, thus insuring that the 12-volt battery connection will be made before switch PC1 passes any current to pump motor P1.

A normally closed timed interlock 486 is provided to open a moment later, thus permitting the operator to move valve plunger 74 immediately to the fast speed lift position, if he so desires. This is accomplished by actuation of pump switch PS2, which is normally in parallel with interlock 486, as the valve plunger 74 approaches its limit of travel. Actuation of PS2 to its normally open contact interrupts the current to the battery sequence coil A, in the present example, which causes switch A to move to its 24-volt contact. The function of the timed interlock 486 is to assure that current is supplied to coil A for a short interval, which insures full actuation of switch A in those instances in which the operator may move the control handle 50 very rapidly from neutral position to a fast speed lift position. The timed interval provides a resistance start for a moment, which reduces wear and tear on the switches, as well as on the commutator of the lift pump motor.

It has been found that the most severe duty imposed on such pump motors occurs during starting wherein, conventionally, the motors are started across the line at full voltage. A reduced voltage starter of the type contemplated substantially reduces the starting current, thereby lengthening the life of the pump motor.

Protection of pump motor P2 is achieved in a slightly different manner. When the pump switch PS2 is actuated it provides current to coil PC2a which then closes switch PC2a and supplies current to pump motor P2 through a resistor 488; the motor P2 is then connected across 24-volts. A normally open timed interlock 490 closes a moment later to supply coil PC2b which then closes switch PC2b in parallel with switch PC2a and resistor 488, thus by-passing the resistor but not until the motor has begun to accelerate. In this manner the usual initial inrush of current to the pump motor is substantially reduced as compared with ordinary across-the-line starting.

It has been found that the use of two lift pumps and motors achieves a very significant improvement in operating efficiency and conserves valuable amounts of battery energy. Operators of such trucks frequently desire to slowly elevate the fork in order to locate it at the right position for entering a pallet. Ordinarily, the operator is forced to use a single relatively large lift pump motor which inherently operates very inefficiently at only a fraction of its rating. Furthermore, the relatively large pump must be driven as against operation of one of two smaller pumps according to the present invention. In addition, if the lift speed is limited by restricting a fluid control valve, a significant quantity of energy is wasted.

A thermostatic switch TS and a blower motor 491 are provided in the circuit to supply an external stream of cooling air to pump motor P1, inasmuch as this motor is normally operated many times more frequently than is pump motor P2 in a typical work cycle.

REACH CIRCUIT

It will be recalled that reach switch RS is conveniently located at the operator station for controlling actuation of pump motor P1, which is adapted to also actuate a suitable drive mechanism, as hereinbefore described in general, for extending and retracting the upright mast 14. Also, that the hand operated lever 93 is pivoted to actuate valving means 96 and switch RS for extending and retracting operations, cam means 97 being provided as an extension of valve plunger 95 for closing switch RS when lever 93 is pivoted in either direction from a neutral position. The switch RS is connected to lead 480 in the circuit so that when it is closed current may be supplied either to motor P1 above (upon energization of switch PC1 following closure of low speed lift switch PS1) or to both motors P1 and P2 (if valve plunger 74 is actuated to also actuate switch PS2), and through rectifier 482 to supply current to one of the coils A or B to actuate one of the battery tap sequence switches, whereby current can be supplied to motor P1 or motors P1 and P2 at 12-volts only. The rectifier 482 permits either of switches RS or PS1 to close the circuit to the 12-volt tap switches A or B, but prevents switch 3MS from energizing switch PC1 to close.

It is important to understand that the arrangement of circuitry is such that the travel speed of the truck is automatically restricted to a maximum of speed 4, or half speed, whenever the reach switch RS is actuated. This is so because switch 3MS cannot effect actuation of switch A or B when it opens at speed 3 to locate the switches for 24-volt supply to the motors M1 and M2, since closed switch RS prevents it. The maximum voltage supply obtainable under this condition is, therefore, 12-volts. Therefore, at a speed 4 position of control handle 50 only speed 2 will be obtained, and at a speed 6 position (wherein switch 5MS closes for paralleling the motors M1 and M2) only speed 4 will be obtained. Likewise, neither can lifting of the fork take place at more than 12 volts for the same reason that 12-volt tape switch A or B is actuated.

In other words, while the driver can control the operation of the truck to perform certain types of work cycles most efficiently by simultaneously causing the truck to travel, to lift, and to reach, or any combination of these three functions, he cannot operate the truck at higher than half speed, nor can he cause the fork to lift at high speed if, at the same time, mast 14 is being either extended or retracted. This is an extremely desirable safety feature in that it minimizes the obvious hazard which would result in, for example, operating the truck at full speed, lifting at high speed, and causing the mast to perform a reach out funnction, all at the same time.

It should also be pointed out that the alternative use of the two halves of the battery B1, B2 not only conserves battery energy during movement of the truck from place to place, but it also results in a highly efficient drive of the mast in extension and retraction. Narrow-aisle trucks have conventionally utilized the same motor-pump means for providing the reaching function as is utilized for lifting the fork. This arrangement has proven to be very inefficient because much less horsepower is required for extending and retracting the mast than is required for lifting the forks under load. Conventionally, during extension or retraction of the mast, which involves operation of the motor for an appreciable period of time, the reach motor drive is utilized at only a small fraction of its maximum horsepower, and it is well known that electric motors operate very inefficiently at a small fraction of their rated horsepower. In other words, a pump which is suitable to raise the fork at relatively high speed is much larger than is required for actuating the mast in extension or retraction. Substantial losses in battery energy have resulted.

In the present construction, as a result of the use of two relatively small lift pumps and motors, I have achieved an important improvement in efficiency by running either one or both of the two lift pumps and motors, as desired, but never at more than 12-volts whenever the reach switch RS is closed. In other words, said pumps and motors are available for lifting the fork at first and second speeds, but during simultaneous extension or retraction of the mast these speeds are less than is available for lifting operations when the mast is stationary. Also, it is an important improvement of my system that in normal operation the reaching function is accomplished by utilizing only one each of the two pump motors and pumps and only one-half of the battery.

SUMMARY

From the foregoing detailed description of the construction and operation of my invention it will now be understood that I have provided a vastly improved and extremely novel control system which is especially well adapted for use with industrial trucks of the narrow-aisle type. The numerous facets of the invention are believed to overcome problems involved heretofore in control systems for such industrial trucks, which were of such a serious nature that despite affording the advantage of large dollar savings over other types of material handling equipment, the narrow-aisle truck has not previously enjoyed the high percentage of the market to which it is properly entitled.

The present construction solves problems of construction and operation which have heretofore greatly limited the application of such trucks. For example, the provision of the single control handle 50, which is capable of fully controlling all major aspects of truck operation, excepting steering of the traction wheels and actuation of the mast in extension and retraction, constitutes an advance in the art, the significance of which cannot be overemphasized. It combines in a single control medium not only control of the lifting and lowering of the fork, control of a plurality of operating and transitional speeds, both in forward and reverse, and a supporting member for steadying the operator, but it also permits automatic control and modulation of braking action through the medium of the master controller and the hydraulic portion of the braking system.

A number of aspects of the invention are present in the master controller per se and in the traction motor control circuitry. The overall arrangement of such structure is such that control handle 50 may relatively effortlessly be actuated to accomplish a highly efficient utilization of battery energy, while the controller and circuitry provide uncommonly smooth truck acceleration and deceleration, as well as protecting circuit switches against excessive arcing, insuring a continuously flowing current in the circuits, where required, while, at the same time, limiting the sudden application of relatively high voltages to the traction and pump motors.

Also, in conjunction with the operation of the master controller in changing the direction of movement of the truck from forward to reverse, or vice versa, novel antiplugging means is provided which is capable not only of limiting a reversal in direction to an operating condition below a predetermined speed, but also of providing a timed interval at a neutral position of the control handle even though the truck is at rest, thereby insuring against an inadvertent reversal in truck direction when, in fact, the operator intends only to apply the brakes.

A braking system is embodied in the present invention which, as above indicated, is controlled automatically upon actuation of the main control handle and as a function of master controller position. In this respect, braking pressure is modulated to provide a smoother braking action than heretofore. It will also be recalled that novel means are provided which permits the hydraulic section of the braking system to operate from the power supply source which also operates a power steering system, even though power steering system pressures may vary across a wide range. I have provided yet additional means in the hydraulic portion of the braking system which is adapted to modulate a residual pressure in the brake cylinders at the traction motors as a function of the load on the fork, whereby to achieve substantially the same braking effect whether the truck is carrying no load, or capacity load, or any intermediate load.

A novel system for controlling the speed of lifting of the fork is provided, which is also controllable from the operator's main control handle. It provides an arrangement of circuitry, including dual motors and pumps, which achieves a significant improvement in operating efficiency over known arrangements. Even more important, however, is the provision of a reach circuit for controlling movements of the mast in extension and retraction, which is combined in such a manner with the fork lift circuit and with the travel circuits that although both lifting, travel and reaching functions can be performed simultaneously, the former two functions are limited during such operation to a fraction of maximum available speed of lift and travel, respectively. This is important both from the standpoint of safety and operating efficiency. Again, in this respect, my construction affords a more efficient utilization of battery energy than previously, in that far less horsepower is normally required for extending and retracting the mast than is required for lifting the fork under load.

The invention additonally provides novel auxilary operator control means, as well as a unique parking brake arrangement both of which are associated with the master controller.

Numerous other features and advantages of this invention have not been mentioned in this summary, but will be apparent from the detailed descripton above.

Although this invention has been described in connection with only one physical embodiment, it will be apparent that the principles thereof are susceptible of numerous other applications that will readily occur to persons skilled in the art. No attempt has been made herein to set forth all the advantages and applications of the improved control system, it being understood that important advantages other than enumerated are present, and also that the disclosure constitutes a teaching which will readily enable persons skilled in the art to practice the invention and to make many changes in the form and relative arrangement of parts within the scope of the invention as defined in the claims appended. In this regard, of course, the drawings and descriptive matter should not be considered as limiting the invention.

I claim:

1. A control system for industrial trucks of the stand-up type having hand operated control means and a traction wheel, comprising normally applied brake means operatively connected to the wheel for braking same, pressure responsive means for releasing the brake, means operatively connected to said hand control and to said pressure responsive means controlling brake release pressure, power steering means adapted to be connected to said traction wheel for steering same, fluid pressure supply means operatively connected to the power steering means and to the brake pressure responsive means, and valve means connected between said pressure supply means and said brake pressure responsive means responsive to a predetermined fluid pressure for limiting the flow of pressure fluid to said brake pressure responsive means such that adequate pressure fluid in said power steering means is maintained.

2. A control system as claimed in claim 1, wherein said valve means is responsive to relatively high fluid pressure at said pressure supply means during steering movement of said traction wheel to restrict the flow of pressure fluid to said brake pressure responsive means upon movement of said hand operated control means to effect a brake releasing action simultaneously with steering movement of said traction wheel.

3. A control system as claimed in claim 1, wherein said operative connection between said hand operated control means and said brake pressure responsive means includes valve means responsive to pressure fluid flowing from said pressure supply means for by-passing at least some such pressure fluid from said brake pressure responsive means.

4. A control system as claimed in claim 3, wherein said operative connection between said hand operated control means and said brake means includes additional means for applying a force to said by-pass valve means in opposition to the response of said by-pass valve means to the pressure fluid flowing from said source, whereby to vary the pressure fluid in said brake pressure responsive means as a function of position of said hand operated control means.

5. A control system as claimed in claim 4 wherein said additional means comprises camming means for modulating fluid pressure in said brake pressure responsive means as a function of position of said hand operated control means.

6. A control system for industrial truck having a steering-driving traction wheel, comprising fluid pressure responsive power steering means adapted to actuate the wheel in steering movement, fluid pressure generating means connected to said power steering means, normally applied brake means operatively connected to the wheel for braking same, fluid pressure responsive means communicating with said pressure generating means for releasing the brake, valving means controlling the flow of pressure fluid from said generating means to said brake pressure responsive means, and an operator control means operatively connected to said valving means for modulating the pressure in said brake pressure responsive means whereby to gradually release the brake upon the application of pressure fluid thereto.

7. A control system as claimed in claim 6 wherein said valving means is adapted to by-pass excess pressure fluid from said brake pressure responsive means, and said operative connection includes means for applying a varying force to said valving means upon demand of the operator whereby to graduate the application of pressure fluid in said brake pressure responsive means to obtain smooth braking action.

8. A control system as claimed in claim 6, wherein a second valving means is provided which is responsive to a pressure generated by said pressure generating means to restrict the flow of fluid from said pressure generating means to the first valving means such that adequate pressure fluid is continuously available at said power steering means.

9. A brake control system comprising wheel means, normally applied brake means operatively connected to said wheel means for braking same, fluid pressure responsive means for releasing the brake means, fluid pressure generating means for supplying pressure fluid to said pressure responsive means, modulating valve means controlling the pressure fluid in said pressure responsive means, operator control means operatively connected to said valve means and effective to apply a variable force to said valve means as a function of operator control position, said latter operative connection including a camming means for applying to said valve means a force which varies in accordance with a preselected schedule of movement of said operator control means whereby to modulate the fluid pressure in said pressure responsive means, and said operator control means being actuatable in opposite directions from a neutral brake applied position to actuate said camming means in opposite directions from a corresponding neutral position, whereby to effect the application of brake release pressure in said brake pressure responsive means upon movement of said operator control means in either direction from said neutral position.

10. A brake control system for industrial truck having load engaging means supported for elevating movement forwardly thereof and fluid pressure responsive hoist means for elevating the load engaging means, comprising fluid pressure responsive truck braking means, fluid pressure generating means operatively connected to the braking means, said operative connection including valve means responsive to said fluid pressure in said hoist means for controlling the fluid pressure applied to said brake means.

11. A brake control system for industrial truck having load engaging means supported for elevating movement forwardly thereof and fluid pressure responsive hoist means for elevating the load engaging means, comprising fluid pressure responsive brake means for controlling braking action of the truck, a pressure fluid source communicating with said brake means, and valve means controlling the fluid pressure applied to said brake means, said valve means communicating with the pressure fluid in said hoist means for varying the level of pressure fluid in said brake means as a function of the load carried by said load engaging means.

12. A brake control system as claimed in claim 11, wherein said brake means is of the normally applied type and an increase in fluid pressure in said brake pressure responsive means releases the brake, said valve means being adapted to effect an increasing by-pass of pressure fluid from said brake pressure responsive means as the load on the load engaging means increases, whereby to increase the application of braking force to stop the truck as the load increases on the load engaging means.

13. A brake control system for industrial truck having load engaging means supported for elevating movement forwardly thereof and fluid pressure responsive hoist means for elevating the load engaging means, comprising pressure responsive truck braking means, a source of fluid pressure communicating with said braking means, a first valve means controlling the fluid pressure applied to said brake means, and a second valve means communicating with fluid pressure in said hoist means for varying the pressure in said brake means as a function of the load carried by the load engaging means.

14. A brake control system as claimed in claim 13, wherein said first and second valve means are in series flow relation and adapted to by-pass excess pressure fluid from said brake means and to modulate fluid pressure in said brake means both as a function of operator demand and fluid pressure in said hoist means.

15. A brake control system as claimed in claim 13, wherein third valve means is responsive to fluid pressure at said source for restricting pressure fluid communication with said brake means following a predetermined pressure rise at said source.

16. A brake control system as claimed in claim 15, wherein fluid pressure operated power steering means communicates with said pressure source, said steering means motivating said predetermined pressure rise which actuates said third valve means to restrict said latter communication in order to assure a continuous supply of pressure fluid to said power steering system.

17. A brake control system as claimed in claim 13, wherein operator control means is operatively connected to said first valve means for varying the force on said first valve means whereby to vary the fluid pressure in said brake means as a function of operator control position.

18. A brake control system as claimed in claim 17 wherein said brake means is of the normally applied type, said brake pressure responsive means effecting a brake releasing action, said operator control means being actuatable in opposite directions from a neutral brake applied position, and said first valve means being adapted to control the application of brake releasing pressure to said brake means as a function of movement of the operator control in either direction from a neutral position.

19. A brake control system for industrial truck having elevatable load engaging means and fluid pressure responsive hoist means for elevating the load engaging means, comprising normally applied brake means, fluid pressure responsive means for releasing the brake means, and valve means for controlling the residual pressure in said fluid pressure responsive means, said valve means communicating with fluid pressure in said hoist means, said fluid pressure varying as a function of the load on the load engaging means, said valve means decreasing the fluid pressure in said brake means as the load on the load engaging means increases whereby said brake means applies an increasing braking force to the truck as the load on the load engaging means increases.

20. A control system for industrial trucks of the stand-up type comprising an operator's stand-up platform located rearwardly thereof, load engaging means supported for elevating movement forwardly thereof, hand operated control means mounted at said platform, a traction wheel supporting one end of the truck, normally applied brake means operatively connected to said hand control means and to said wheel for braking same, hydraulic fluid pressure responsive means for releasing the brake, power steering means including common pump means and pump pressure responsive actuator means operatively connected to the wheel for steering same, and means connecting said pump means to said pressure responsive brake release means such that both said brake release means and said power steering means are controlled simultaneously or independently during truck operation and both receive pressure fluid from said common pump means.

21. A control system for industrial trucks of the stand-up type comprising an operator's stand-up platform located thereon, hand operated control means at said platform, a traction wheel, normally applied brake means operatively connected to said wheel for braking same, fluid pressure responsive means for releasing the brake, and means operatively connecting said hand control means to said brake release means for modulating brake release pressure during movement of said hand control, including valve means controlling the application of fluid pressure to said pressure responsive means and camming means connected to said hand control means and to said valve means for producing said modulated brake release pressure as a function of the position of the hand control means, said hand operated means being movable in either direction from a neutral position, such movements producing rotation of said camming means in opposite directions from a neutral brake applied position, said camming means producing substantially equal modulation of brake release pressure irrespective of the direction of rotation thereof from a neutral position.

22. A control system for industrial trucks of the stand-up type comprising an operator's stand-up platform located thereon, hand operated control means at said platform, a traction wheel, normally applied brake means operatively connected to said wheel for braking same, fluid pressure responsive means for releasing the brake, means operatively connecting said hand control means to said brake release means for modulating brake release pressure during predetermined movement of said hand control whereby to achieve a smooth braking action, foot operated means mounted on said platform, and means connecting said foot operated means to said brake means such that movement of the foot operated means in one direction actuates said brake means to apply the brake.

23. A control system as claimed in claim 22 wherein brake control camming means is interposed in operative connection between said hand control means and said brake release means and between said foot operated means and said brake release means for controlling the rate of modulation of brake release pressure.

24. A control system for industrial trucks of the stand-up type comprising an operator's stand-up platform located thereon, hand operated control means at said platform, a traction wheel, normally applied brake means operatively connected to said wheel for braking same, fluid pressure responsive means for releasing the brake, means operatively connecting said hand control means to said brake release means for modulating brake release pressure during movement of said hand control, including valve means for controlling the application of fluid pressure to said pressure responsive means and camming means operatively connected to said hand control means and to said valve means for producing said modulated brake release pressure as a function of the position of the hand control means, and auxiliary hand control means mounted generally transverse to said first-mentioned hand control means, said auxiliary control means being operatively connected to said camming means for also modulating brake release pressure as a function of the position of the auxiliary control means.

25. A control system as claimed in claim 24 wherein foot operated brake control means is mounted on said platform and is operatively connected to said brake control means for causing said brakes to be applied whenever the operator dismounts from the platform.

26. A control system for industrial trucks having load engaging means connected thereto, a hand operated control means mounted at an operator's station and a traction wheel, comprising a normally applied brake means operatively connected to the wheel for braking same, fluid pressure responsive means for releasing the brake, means operatively connecting said hand control means to said brake release means for modulating brake release pressure during predetermined movement of said hand control, said operative connection including valve means for controlling the application of fluid pressure to said pressure responsive means, and means responsive to the mass of the load carried by said load engaging means for varying the braking force applied to said brake means at any given position of said hand control means.

27. A control system for industrial trucks of the stand-up type comprising an operator's stand-up platform located thereon, hand operated control means at said platform, a traction wheel, normally applied brake means operatively connected to said wheel for braking same, fluid pressure responsive means for releasing the brake, and means operatively connecting said hand control means to said brake release means for modulating brake release pressure during predetermined movement of said hand control, including modulating valve means having a contoured surface for varying the effective area of the valve means to control the application of fluid pressure to said pressure responsive means, and camming means having a contoured surface operatively connected to said hand control means and to said valve means for producing a modulated brake release pressure as a function of the positions of the hand control means and the contoured surfaces of said valve means and camming means.

References Cited in the file of this patent
UNITED STATES PATENTS

| | | |
|---|---|---|
| 991,190 | Barnum | May 2, 1911 |
| 1,066,739 | Larson | July 8, 1913 |
| 1,748,041 | Backhus | Feb. 18, 1930 |
| 1,831,044 | Storer | Nov. 10, 1931 |
| 1,922,227 | Brecht | Aug. 15, 1933 |
| 2,176,170 | Flowers | Oct. 17, 1939 |
| 2,301,832 | Towson | Nov. 10, 1942 |
| 2,399,605 | Schroeder | Apr. 30, 1946 |
| 2,414,192 | Dunham | Jan. 14, 1947 |
| 2,456,320 | Repke | Dec. 14, 1948 |
| 2,525,461 | Schnell | Oct. 10, 1950 |
| 2,567,427 | Fox | Sept. 11, 1951 |
| 2,598,865 | Turner | June 3, 1952 |
| 2,705,059 | Wilkinson | Mar. 29, 1955 |
| 2,745,506 | McCallum | May 15, 1956 |
| 2,789,648 | Huffman | Apr. 23, 1957 |
| 2,822,064 | Weiland | Feb. 4, 1958 |
| 2,855,071 | Arnot | Oct. 7, 1958 |
| 2,896,733 | Rockwell | July 28, 1959 |
| 2,940,796 | Ortmann et al. | June 14, 1960 |

UNITED STATES PATENT OFFICE
CERTIFICATE OF CORRECTION

Patent No. 3,080,019                                                     March 5, 1963

Russell Hastings, Jr.

It is hereby certified that error appears in the above numbered patent requiring correction and that the said Letters Patent should read as corrected below.

Column 13, line 52, for "R" read -- R2 --; column 17, line 27, for "block" read -- blocking --; column 19, line 45, for "169" read -- 160 --; column 23, line 45, for "tape" read -- tap --.

Signed and sealed this 1st day of October 1963.

(SEAL)
Attest:

ERNEST W. SWIDER

Attesting Officer

DAVID L. LADD

Commissioner of Patents